United States Patent
Soliman

(10) Patent No.: US 11,691,897 B2
(45) Date of Patent: Jul. 4, 2023

(54) WATER TREATMENT FOR INJECTION IN HYDROCARBON RECOVERY

(71) Applicant: Saudi Arabian Oil Company, Dhahran (SA)

(72) Inventor: Mohamed Ahmed Soliman, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 160 days.

(21) Appl. No.: 17/140,312

(22) Filed: Jan. 4, 2021

(65) Prior Publication Data
US 2022/0212964 A1 Jul. 7, 2022

(51) Int. Cl.
| | |
|---|---|
| *E21B 43/12* | (2006.01) |
| *E21B 43/16* | (2006.01) |
| *E21B 47/00* | (2012.01) |
| *B01D 61/00* | (2006.01) |

(Continued)

(52) U.S. Cl.
CPC ............ *C02F 1/445* (2013.01); *B01D 61/005* (2013.01); *E21B 43/12* (2013.01); *E21B 43/16* (2013.01); *E21B 47/00* (2013.01); *C02F 2103/08* (2013.01); *C02F 2201/005* (2013.01); *C02F 2209/10* (2013.01); *C02F 2209/40* (2013.01); *C02F 2301/08* (2013.01)

(58) Field of Classification Search
CPC .......... E21B 43/12; E21B 43/16; E21B 47/00; B01D 61/005; C02F 1/445; C02F 2103/08; C02F 2201/005; C02F 2209/10; C02F 2209/40; C02F 2301/08

See application file for complete search history.

(56) References Cited

U.S. PATENT DOCUMENTS

| | | | |
|---|---|---|---|
| 4,180,457 | A | 12/1979 | Popp et al. |
| 5,643,469 | A | 7/1997 | Prevost et al. |
| 6,136,174 | A | 10/2000 | Berry et al. |

(Continued)

FOREIGN PATENT DOCUMENTS

| | | |
|---|---|---|
| CN | 201735213 | 2/2011 |
| CN | 104531204 | 4/2015 |

(Continued)

OTHER PUBLICATIONS

Devold, "Oil and Gas Production Handbook: An Introduction to Oil and Gas Production, Transport, Refining and Petrochemical Industry," ABB Oil and Gas, edition 3.0, Aug. 2013, 162 pages.

(Continued)

*Primary Examiner* — Matthew R Buck
(74) *Attorney, Agent, or Firm* — Fish & Richardson P.C.

(57) ABSTRACT

An aqueous feed stream having a first total dissolved solids (TDS) level is flowed to a forward osmosis separator. The aqueous feed stream includes seawater. An aqueous draw stream having a second TDS level is flowed to the forward osmosis separator. The second TDS level is greater than the first TDS level. A disposal stream and an injection fluid stream is produced by the forward osmosis separator by allowing water to pass from the aqueous feed stream to the aqueous draw stream through a membrane of the forward osmosis separator based on a difference between the first TDS level and the seconds TDS level. The injection fluid stream is flowed from the osmosis separator to a subterranean formation.

18 Claims, 16 Drawing Sheets

(51) Int. Cl.
*C02F 1/44* (2023.01)
*C02F 103/08* (2006.01)

(56) References Cited

U.S. PATENT DOCUMENTS

| | | | |
|---|---|---|---|
| 7,140,441 B2 | 11/2006 | Hauge et al. | |
| 7,455,109 B2* | 11/2008 | Collins | B01D 61/005 |
| | | | 166/266 |
| 7,901,578 B2* | 3/2011 | Pruet | B01D 17/085 |
| | | | 210/257.2 |
| 7,914,680 B2* | 3/2011 | Cath | B01D 61/002 |
| | | | 210/652 |
| 7,942,205 B2* | 5/2011 | Sharif | E21B 43/40 |
| | | | 166/371 |
| 8,790,509 B2 | 7/2014 | Vu | |
| 10,308,524 B1* | 6/2019 | Ahmed | C02F 1/445 |
| 10,329,171 B2 | 6/2019 | Henthorne | |
| 2003/0150324 A1 | 8/2003 | West | |
| 2010/0224561 A1* | 9/2010 | Marcin | B01D 61/025 |
| | | | 210/209 |
| 2011/0139625 A1 | 6/2011 | Arntzen et al. | |
| 2014/0151300 A1 | 6/2014 | Savage et al. | |
| 2015/0014258 A1 | 1/2015 | Whitney et al. | |
| 2015/0122654 A1 | 5/2015 | Beg et al. | |
| 2017/0028349 A1* | 2/2017 | Blandin | B01D 61/002 |
| 2017/0173499 A1 | 6/2017 | Sprenkel et al. | |
| 2018/0229184 A1 | 8/2018 | Resendes et al. | |
| 2018/0370834 A1* | 12/2018 | Sutton-Sharp | B01D 61/58 |
| 2020/0180989 A1 | 6/2020 | Mosher | |
| 2020/0398191 A1 | 12/2020 | Soliman | |
| 2020/0398192 A1 | 12/2020 | Soliman | |
| 2020/0399145 A1* | 12/2020 | Janson | B01D 61/002 |

FOREIGN PATENT DOCUMENTS

| | | | |
|---|---|---|---|
| CN | 103695029 | | 8/2016 |
| CN | 106590731 | | 4/2017 |
| CN | 107723020 | | 2/2018 |
| EP | 2497556 | | 9/2012 |
| JP | 2012250200 | | 12/2012 |
| KR | 20130074104 A | * | 7/2013 |
| KR | 20180100011 A | * | 9/2018 |
| KR | 20200081051 A | * | 7/2020 |

OTHER PUBLICATIONS

Manning and Thompson, "Oilfield Processing," Chapter 8, vol. 2, Pennwell Publishing Co, 1995, 14 pages.

Piasecki et al., "Vessel Internal Electrostatic Coalescer (VIEC)," ABB Review, Apr. 2004, 4 pages.

PCT International Search Report and Written Opinion in International Appln. No. PCT/US2022/011156, dated Apr. 19, 2022, 15 pages.

* cited by examiner

WATER TREATMENT FOR INJECTION IN HYDROCARBON RECOVERY

TECHNICAL FIELD

This disclosure relates to water treatment, and in particular, to produce injection fluid for enhanced hydrocarbon recovery.

BACKGROUND

Primary hydrocarbon recovery involves the extraction of hydrocarbons from a subterranean formation either by the natural pressure within the subterranean formation or facilitation by an artificial lift device, such as an electric submersible pump. Secondary hydrocarbon recovery involves injection of fluid into a subterranean formation to displace hydrocarbons and produce them to the surface. Enhanced oil recovery involves altering a property of the hydrocarbons and/or the subterranean formation to make the hydrocarbons more conducive to extraction.

SUMMARY

This disclosure describes technologies relating to water treatment, and in particular, to produce injection fluid for enhanced hydrocarbon recovery. Certain aspects of the subject matter described can be implemented as a method. An aqueous feed stream having a first total dissolved solids (TDS) level is flowed to a forward osmosis separator. The aqueous feed stream includes seawater. An aqueous draw stream having a second TDS level is flowed to the forward osmosis separator. The second TDS level is greater than the first TDS level. A disposal stream and an injection fluid stream is produced by the forward osmosis separator by allowing water to pass from the aqueous feed stream to the aqueous draw stream through a membrane of the forward osmosis separator based on a difference between the first TDS level and the seconds TDS level. The injection fluid stream is flowed from the osmosis separator to a subterranean formation.

This, and other aspects, can include one or more of the following features.

In some implementations, the aqueous draw stream includes water from the subterranean formation to which the injection fluid stream is flowed.

In some implementations, the second TDS level is at least 150% of the first TDS level.

In some implementations, the method includes measuring a flow rate of the injection fluid stream from the forward osmosis separator. In some implementations, the method includes adjusting a flow rate of the disposal stream from the forward osmosis separator based on the measured flow rate of the injection fluid stream from the forward osmosis separator.

In some implementations, the method includes measuring a flow rate of the injection fluid stream from the forward osmosis separator. In some implementations, the method includes adjusting a flow rate of the aqueous feed stream to the forward osmosis separator based on the measured flow rate of the injection fluid stream from the forward osmosis separator.

In some implementations, the method includes measuring a TDS level of the injection fluid stream. In some implementations, the method includes adjusting a flow rate of the aqueous feed stream to the forward osmosis separator based on the measured TDS level of the injection fluid stream.

In some implementations, the method includes flowing a second aqueous feed stream having a third TDS level to a second forward osmosis separator. In some implementations, the method includes flowing a second aqueous draw stream having a fourth TDS level to the second forward osmosis separator. In some implementations, the fourth TDS level is greater than the third TDS level. In some implementations, the second aqueous draw stream includes seawater. In some implementations, the method includes producing, by the second forward osmosis separator, a second disposal stream and the aqueous feed stream having the first TDS level by allowing water to pass from the second aqueous feed stream to the second aqueous draw stream through a second membrane of the second forward osmosis separator based on a difference between the third TDS level and the fourth TDS level.

In some implementations, the fourth TDS level is at least 150% of the third TDS level.

Certain aspects of the subject matter described can be implemented as a method. A feed stream having a first TDS level is flowed to a forward osmosis separator. The feed stream includes a treated sewage effluent. Seawater is processed to produce a draw stream and a permeate stream. The draw stream has a second TDS level that is greater than the first TDS level. The permeate stream has a third TDS level that is less than the second TDS level. The draw stream is flowed to the forward osmosis separator. A disposal stream and an injection fluid stream is produced by the forward osmosis separator by allowing water to pass from the feed stream to the draw stream through a membrane of the forward osmosis separator based on a difference between the first TDS level and the second TDS level. The injection fluid stream is flowed from the forward osmosis separator to a subterranean formation.

This, and other aspects, can include one or more of the following features.

In some implementations, the second TDS level is at least 150% of the first TDS level.

In some implementations, the method includes measuring a flow rate of the injection fluid stream from the forward osmosis separator. In some implementations, the method includes adjusting a flow rate of the draw stream to the forward osmosis separator based on the measured flow rate of the injection fluid stream from the forward osmosis separator.

In some implementations, the method includes measuring a TDS level of the injection fluid stream. In some implementations, the method includes adjusting a flow rate of the feed stream to the forward osmosis separator based on the measured TDS level of the injection fluid stream.

Certain aspects of the subject matter described can be implemented as a system. The system includes an aqueous feed stream, an aqueous draw stream, and a forward osmosis separator. The aqueous feed stream has a first TDS level. The aqueous feed stream includes seawater. The aqueous draw stream has a second TDS level that is greater than the first TDS level. The forward osmosis separator includes a feed compartment, a draw compartment, and a membrane disposed between the feed compartment and the draw compartment. The feed compartment includes a feed inlet and a disposal outlet. The feed inlet is configured to receive the aqueous feed stream into the feed compartment. The disposal outlet is configured to discharge a disposal stream from the feed compartment. The draw compartment includes a draw inlet and an injection fluid outlet. The draw inlet is configured to receive the aqueous draw stream into the draw compartment. The injection fluid outlet is configured to discharge an injection fluid stream from the draw compartment. The membrane is configured to allow passage of water between the feed compartment and the draw compartment through the membrane based on a difference between the first TDS level and the second TDS level, thereby forming the disposal stream and the injection stream. The injection stream is configured to be flowed to a subterranean formation.

This, and other aspects, can include one or more of the following features.

In some implementations, the aqueous draw stream includes water from the subterranean formation to which the injection fluid stream is to be flowed.

In some implementations, the second TDS level is at least 150% of the first TDS level.

In some implementations, the system includes a flow control subsystem.

In some implementations, the flow control subsystem includes a flowmeter configured to measure a flow rate of the injection fluid stream. In some implementations, the flow control subsystem includes a control valve configured to adjust a flow rate of the disposal stream. In some implementations, the flow control subsystem includes a controller communicatively coupled to the flowmeter and the control valve. In some implementations, the controller is configured to adjust a position of the control valve to adjust the flow rate of the disposal stream based on the flow rate of the injection fluid stream measured by the flowmeter.

In some implementations, the flow control subsystem includes a flow meter configured to measure a flow rate of the injection fluid stream. In some implementations, the flow control subsystem includes a pump configured to flow the aqueous feed stream to the feed inlet of the feed compartment. In some implementations, the flow control subsystem includes a controller communicatively coupled to the flowmeter and the pump. In some implementations, the controller is configured to adjust a speed of the pump to adjust the flow of the aqueous feed stream to the feed inlet of the feed compartment based on the flow rate of the injection fluid stream measured by the flowmeter.

In some implementations, the flow control subsystem includes a TDS meter configured to measure a TDS level of the injection fluid stream. In some implementations, the flow control subsystem includes a control valve configured to adjust a flow rate of the aqueous feed stream. In some implementations, the flow control subsystem includes a controller communicatively coupled to the TDS meter and the control valve. In some implementations, the controller is configured to adjust a position of the control valve to adjust the flow rate of the aqueous feed stream based on the TDS level of the injection fluid stream measured by the TDS meter.

In some implementations, the system includes a second aqueous feed stream having a third TDS level. In some implementations, the system includes a second aqueous draw stream having a fourth TDS level that is greater than the third TDS level. In some implementations, the second aqueous draw stream includes seawater. In some implementations, the system includes a second forward osmosis separator. In some implementations, the second forward osmosis separator includes a second feed compartment, a second draw compartment, and a second membrane disposed between the second feed compartment and the second draw compartment. In some implementations, the second feed compartment includes a second feed inlet and a second disposal outlet. In some implementations, the second feed inlet is configured to receive the second aqueous feed stream into the second feed compartment. In some implementations, the second disposal outlet is configured to discharge a second disposal stream from the second feed compartment. In some implementations, the second draw compartment includes a second draw inlet and a feed outlet. In some implementations, the second draw inlet is configured to receive the second aqueous draw stream into the second draw compartment. In some implementations, the feed outlet is configured to discharge the aqueous feed stream from the second draw compartment. In some implementations, the second membrane is configured to allow passage of water between the second feed compartment and the second draw compartment through the second membrane based on a difference between the third TDS level and the fourth TDS level, thereby forming the second disposal stream and the aqueous feed stream having the first TDS level.

In some implementations, the fourth TDS level is at least 150% of the third TDS level.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Water is typically produced with hydrocarbons (for example, crude oil) from subterranean formations. The production stream from the subterranean formation is processed to separate the water from the hydrocarbons. In some cases, the water that has been separated from the hydrocarbons can be further processed to form an injection fluid that can be flowed back into the subterranean formation to improve hydrocarbon production from the subterranean formation. For example, the injection fluid formed from the processed water can be flowed into the subterranean formation to alter characteristic(s) of the subterranean formation to improve hydrocarbon mobility and, in turn, production from the subterranean formation.

The subject matter described in this disclosure can be implemented in particular implementations, so as to realize one or more of the following advantages. The use of groundwater for water injection in enhanced oil recovery can be reduced. The systems and methods described in this disclosure can be implemented with decreased capital and operating costs in comparison to conventional seawater desalination technologies for producing injection fluid for enhanced oil recovery. The systems and methods described in this disclosure can be implemented with decreased spacing requirements in comparison to conventional seawater desalination technologies for producing injection fluid for enhanced oil recovery. In some cases, two osmosis separators in a series configuration can be implemented to allow for use of sewage water in reservoir pressure maintenance.

Figure 1A:
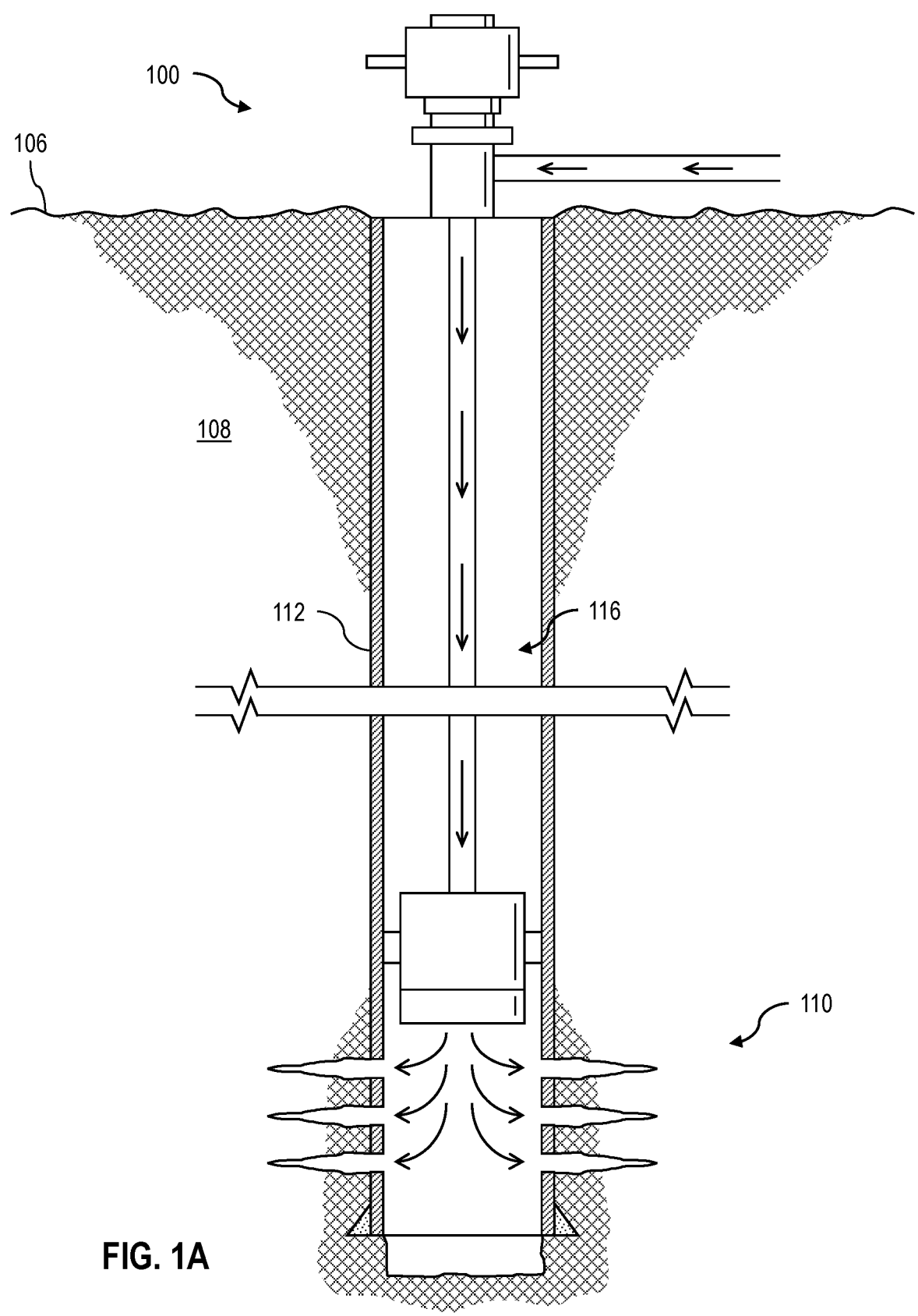
FIG. 1A is a schematic diagram of an example well.
Figure 1B:
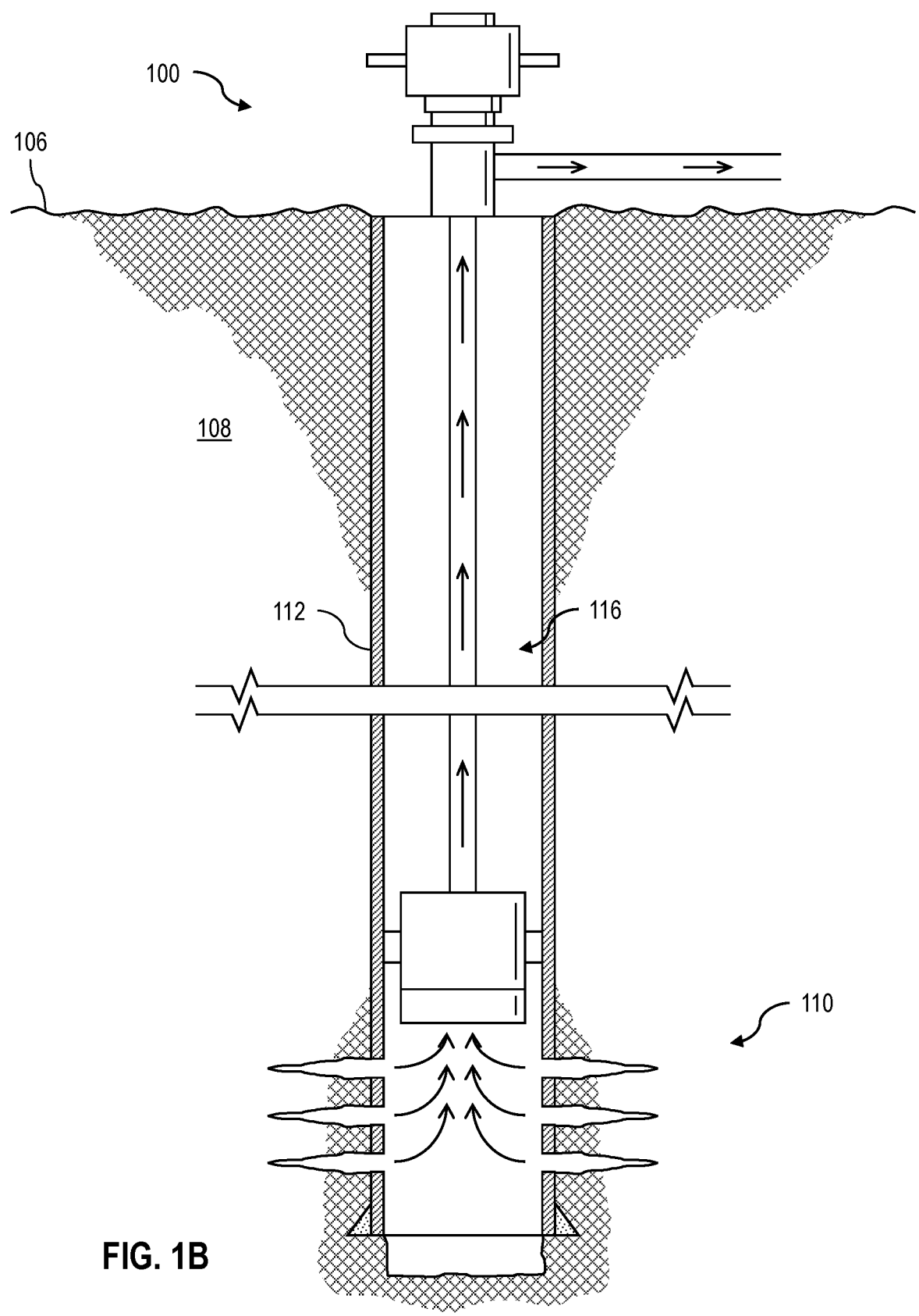
FIG. 1B is a schematic diagram of an example well.

FIGS. 1A and 1B depict an example well 100 constructed in accordance with the concepts herein. The well 100 extends from the surface 106 through the Earth 108 to one or more subterranean zones of interest 110 (one shown). The well 100 enables access to the subterranean zones of interest 110 to allow recovery (that is, production) of fluids to the surface 106 and, in some implementations, additionally or alternatively allows fluids to be placed in the Earth 108. In some implementations, the subterranean zone 110 is a formation within the Earth 108 defining a reservoir, but in other instances, the zone 110 can be multiple formations or a portion of a formation. The subterranean zone can include, for example, a formation, a portion of a formation, or multiple formations in a hydrocarbon-bearing reservoir from which recovery operations can be practiced to recover trapped hydrocarbons. In some implementations, the subterranean zone includes an underground formation of naturally fractured or porous rock containing hydrocarbons (for example, oil, gas, or both). In some implementations, the well can intersect other types of formations, including reservoirs that are not naturally fractured. For simplicity's sake, the well 100 is shown as a vertical well, but in other instances, the well 100 can be a deviated well with a wellbore deviated from vertical (for example, horizontal or slanted), the well 100 can include multiple bores forming a multilateral well (that is, a well having multiple lateral wells branching off another well or wells), or both.

In some implementations, as shown in FIG. 1A, the well 100 is an injection well that is used to inject fluid from the surface 106 and into the subterranean zones of interest 110. The concepts herein, though, are not limited in applicability to injection wells, and could be used in production wells (such as gas wells or oil wells) as shown in FIG. 1B, wells for producing other gas or liquid resources or could be used in injection wells, disposal wells, or other types of wells similarly used in placing fluids into the Earth. The term "gas well" refers to a well that is used in producing hydrocarbon gas (such as natural gas) from the subterranean zones of interest 110 to the surface 106. While termed "gas well," the well need not produce only dry gas, and may incidentally or in much smaller quantities, produce liquid including oil, water, or both. The term "oil well" refers to a well that is used in producing hydrocarbon liquid (such as crude oil) from the subterranean zones of interest 110 to the surface 106. While termed an "oil well," the well not need produce only hydrocarbon liquid, and may incidentally or in much smaller quantities, produce gas, water, or both. In some implementations, the production from a gas well or an oil well can be multiphase in any ratio. In some implementations, the production from a gas well or an oil well can produce mostly or entirely liquid at certain times and mostly or entirely gas at other times. For example, in certain types of wells, it is common to produce water for a period of time to gain access to the gas in the subterranean zone.

The wellhead defines an attachment point for other equipment to be attached to the well 100. For example, FIG. 1B shows well 100 being produced with a Christmas tree attached to the wellhead. The Christmas tree includes valves used to regulate flow into or out of the well 100. The wellbore of the well 100 is typically, although not necessarily, cylindrical. All or a portion of the wellbore is lined with a tubing, such as casing 112. The casing 112 connects with a wellhead at the surface 106 and extends downhole into the wellbore. The casing 112 operates to isolate the bore of the well 100, defined in the cased portion of the well 100 by the inner bore 116 of the casing 112, from the surrounding Earth 108. The casing 112 can be formed of a single continuous tubing or multiple lengths of tubing joined (for example, threadedly) end-to-end. In FIGS. 1A and 1B, the casing 112 is perforated in the subterranean zone of interest 110 to allow fluid communication between the subterranean zone of interest 110 and the bore 116 of the casing 112. In some implementations, the casing 112 is omitted or ceases in the region of the subterranean zone of interest 110. This portion of the well 100 without casing is often referred to as "open hole."

In particular, casing 112 is commercially produced in a number of common sizes specified by the American Petroleum Institute (the "API"), including 4-½, 5, 5-½, 6, 6-⅝, 7, 7-⅝, 7-¾, 8-⅝, 8-¾, 9-⅝, 9-¾, 9-⅞, 10-¾, 11-¾, 11-⅞, 13-⅜, 13-½, 13-⅝, 16, 18-⅝, and 20 inches, and the API specifies internal diameters for each casing size.

Figure 2A:
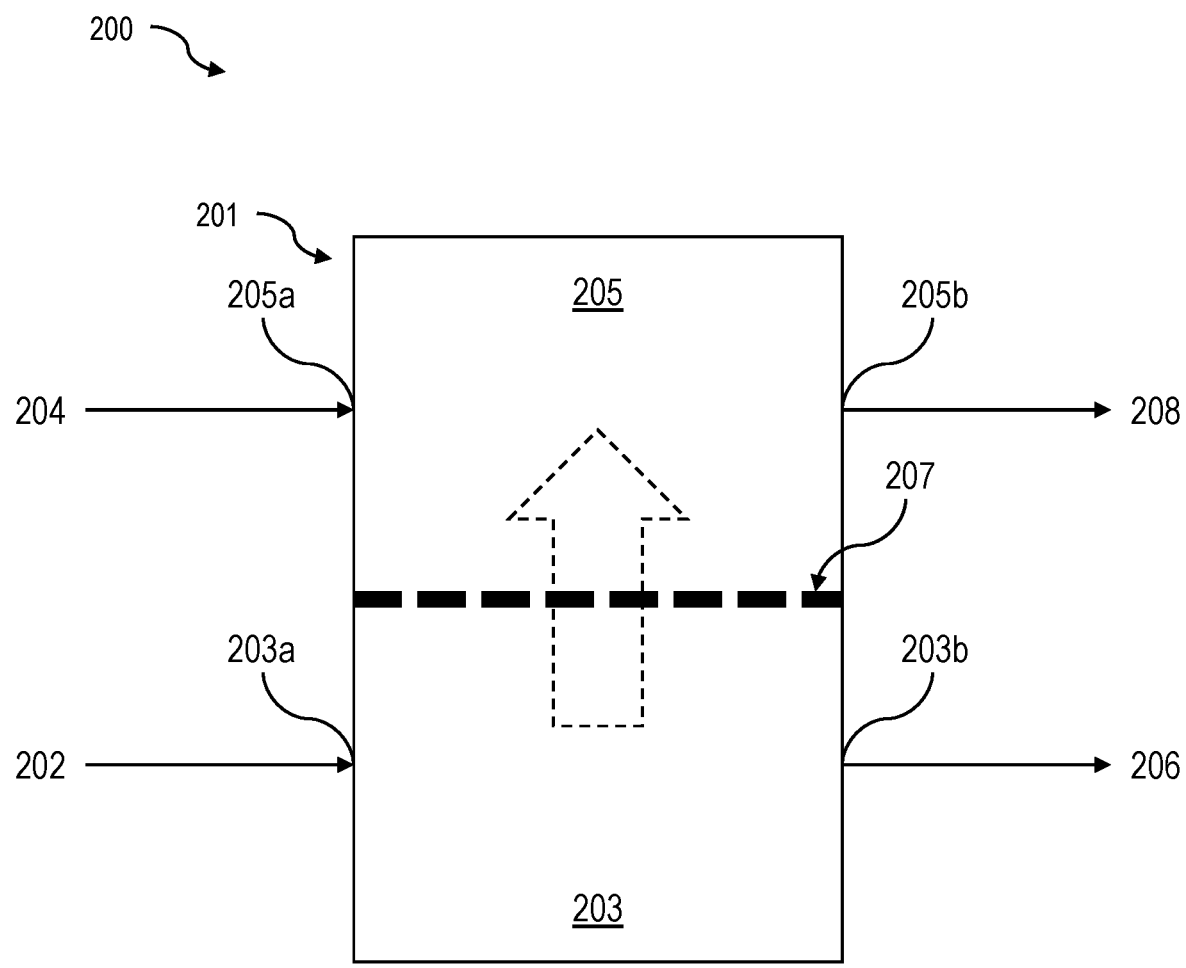
FIG. 2A is a schematic diagram of an example water treatment system to form an injection fluid that can be flowed to the well of FIG. 1A.

FIG. 2A depicts a system 200 that can be used to treat water to form an injection fluid, which can be used as a treatment fluid to improve hydrocarbon production from a subterranean formation (for example, using the well 100). The system 200 includes an osmosis separator 201. The osmosis separator 201 transfers water from one fluid stream to another fluid stream via osmotic pressure difference. In some implementations, the osmosis separator 201 is a forward osmosis separator or a pressure retarded osmosis separator. The osmosis separator 201 includes a feed compartment 203, a draw compartment 205, and a membrane 207 that is disposed between the feed compartment 203 and the draw compartment 205.

The feed compartment 203 includes a feed inlet 203a and a disposal outlet 203b. The feed inlet 203a is configured to receive an aqueous feed stream 202 into the feed compartment 203. The aqueous feed stream 202 has a first total dissolved solids (TDS) level. In some implementations, the aqueous feed stream 202 includes seawater. In some implementations, the first TDS level of the aqueous feed stream 202 is at least 10,000 parts per million (ppm), at least 15,000 ppm, at least 20,000 ppm, at least 25,000 ppm, at least 30,000 ppm, or at least 35,000 ppm. In some implementations, the first TDS level of the aqueous feed stream 202 is about 55,000 ppm, 50,000 ppm, about 45,000 ppm, about 40,000 ppm, about 35,000 ppm, about 30,000 ppm, about 25,000 ppm, about 20,000 ppm, about 15,000 ppm, or about 10,000 ppm. In some implementations, the aqueous feed stream 202 includes a treated sewage effluent (TSE). In some implementations, the first TDS level of the aqueous feed stream 202 is less than 1,000 ppm.

The draw compartment 205 includes a draw inlet 205a and an injection fluid outlet 205b. The draw inlet 205a is configured to receive an aqueous draw stream 204 into the draw compartment 205. The aqueous draw stream 204 has a second TDS level that is greater than the first TDS level of the aqueous feed stream 202. In some implementations, the second TDS level of the aqueous draw stream 204 is at least 150% of the first TDS level of the aqueous feed stream 202. For example, if the first TDS level of the aqueous feed stream 202 is 30,000 ppm, then the second TDS level of the aqueous draw stream 204 is at least 45,000 ppm.

The membrane 207 is configured to allow passage of water between the feed compartment 203 and the draw compartment 205 through the membrane 207 based on a difference between the first TDS level of the aqueous feed stream 202 and the second TDS level of the aqueous draw stream 204. Because the second TDS level of the aqueous draw stream 204 is greater than the first TDS level of the aqueous feed stream 202, the aqueous draw stream 204 has a greater osmotic pressure than the aqueous feed stream 202. Osmotic pressure can be calculated by Equation (1):

$$\pi = CRT \quad (1)$$

where C is concentration of ions (for example, TDS level), R is the universal gas constant, and T is the operating temperature in absolute units (such as Kelvin or Rankine). Because osmotic pressure depends on operating temperature, a heating or cooling device (such as a heat exchanger) can be provided to control the operating temperature of fluid entering the osmosis separator 201. Because osmotic pressure is directly proportional to TDS level, in some implementations, the osmotic pressure of the aqueous draw stream 204 is at least 150% of the osmotic pressure of the aqueous feed stream 202. For example, if the osmotic pressure of the aqueous feed stream 202 is psi, then the osmotic pressure of the aqueous draw stream 204 is at least psi.

Water preferentially flows from aqueous feed stream 202 in the feed compartment 203 through the membrane 207 to the aqueous draw stream 204 in the draw compartment 205 (depicted by dotted arrow). Consequently, within the osmosis separator 201, water transfers out of the aqueous feed stream 202 to form a disposal stream 206, and water transfers into the aqueous draw stream 204 to form an injection fluid stream 208. Estimated water flux (rate of transfer) through the membrane 207 can be calculated by Equation (2):

$$J_w = K_w (\Delta P - \Delta \pi) \quad (2)$$

where $J_w$ is water flux through the membrane 207, $K_w$ is the permeability coefficient for water for the membrane 207 (related to cross-sectional area and thickness of the membrane 207), $\Delta P$ is hydraulic pressure differential across the membrane 207, and $\Delta \pi$ is osmotic pressure differential across the membrane 207.

The disposal outlet 203b is configured to discharge the disposal stream 206 from the feed compartment 203. The injection fluid outlet 205b is configured to discharge the injection fluid stream 208 from the draw compartment 205. The disposal stream 206 exiting the osmosis separator 201 has a greater concentration of TDS in comparison to the aqueous feed stream 202 entering the osmosis separator 201. The injection fluid stream 208 exiting the osmosis separator 201 has a smaller concentration of TDS in comparison to the aqueous draw stream 204 entering the osmosis separator 201. In effect, the aqueous feed stream 202 is used to dilute the aqueous draw stream 204.

The disposal stream 206 can be disposed. The injection fluid stream 208 can be flowed to a subterranean formation (for example, using the injection well 100 of FIG. 1A). In some implementations, the injection fluid stream 208 is processed before it is flowed to the subterranean formation.

In some implementations, the aqueous draw stream 204 includes water the same subterranean formation to which the injection fluid stream 208 is flowed. For example, the production well of FIG. 1B and the injection well of FIG. 1A penetrate the subterranean formation, and water that is produced along with hydrocarbons from the production well is separated from the produced hydrocarbons. In some implementations, the aqueous draw stream 204 is the water that is separated from the produced hydrocarbons.

Figure 2B:
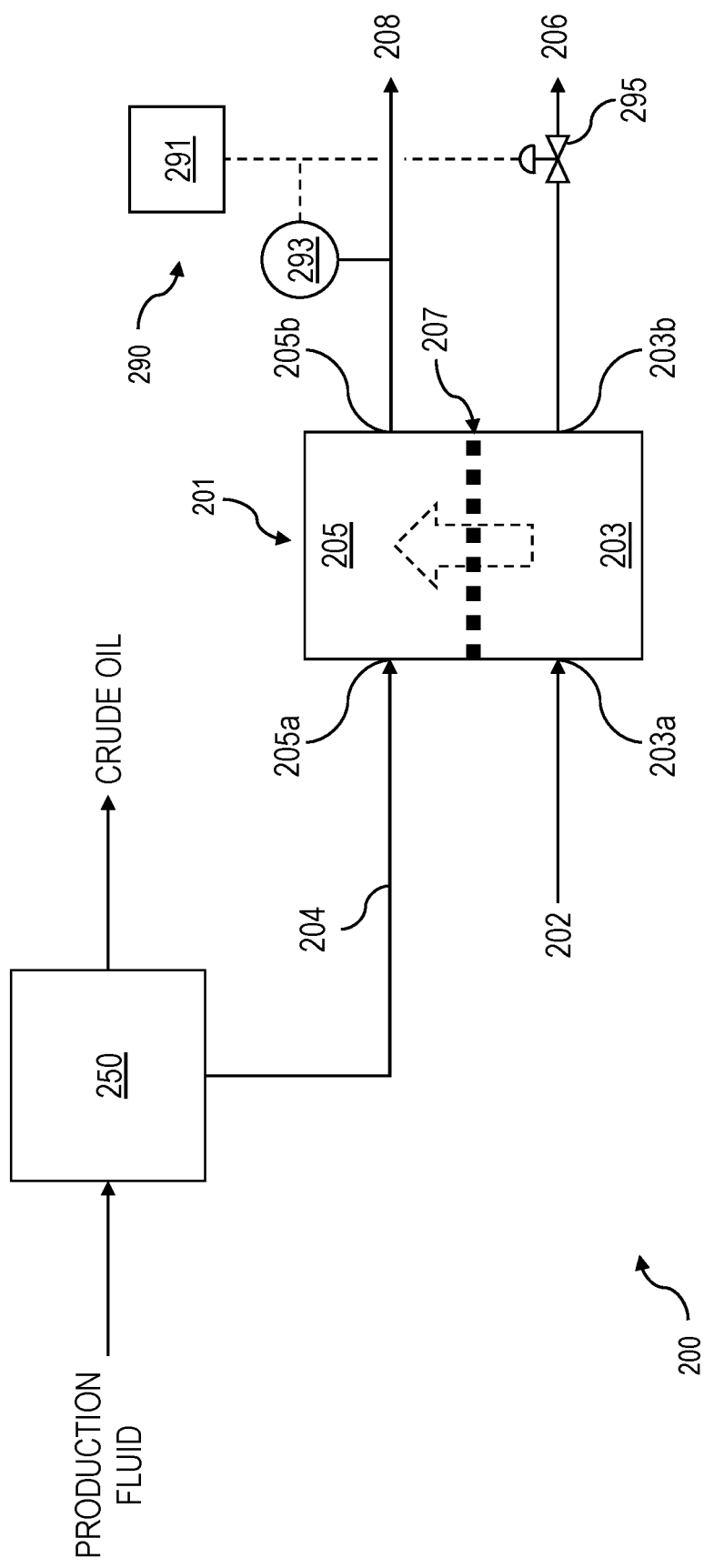
FIG. 2B is a schematic diagram of an example water treatment system to form an injection fluid that can be flowed to the well of FIG. 1A.

FIG. 2B depicts an implementation of the system 200 that includes a crude oil processing unit 250. The crude oil processing unit 250 receives a production stream (for example, from the production well 100 of FIG. 1B) and processes the production stream to produce a dry crude oil product. Processing in the crude oil processing unit 250 includes separating water that has been produced along with the hydrocarbons from the production well. The water separated from the hydrocarbons by the crude oil processing unit 250 can be used as the aqueous draw stream 204.

Figure 4:
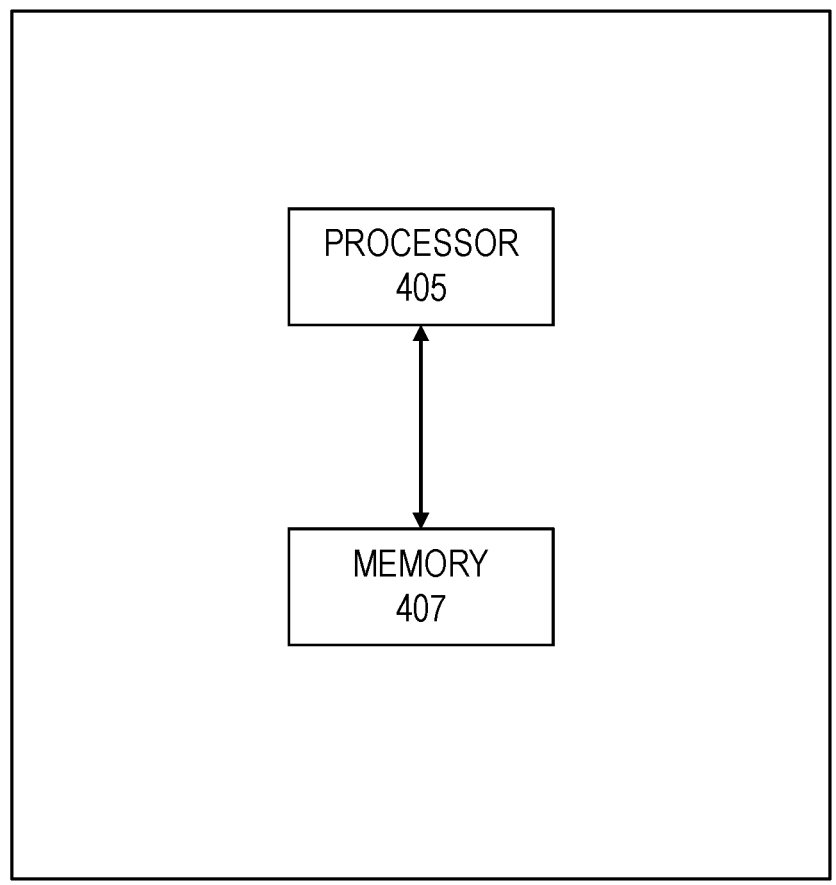
FIG. 4 is a schematic diagram of an example controller that can be used in fluid flow control.

The system 200 includes a flow control subsystem 290 that controls fluid flow in the system 200. The flow control subsystem 290 can control the flow of the injection fluid stream 208 to an injection well (for example, the injection well 100 of FIG. 1A). The flow control system 290 includes a controller 291, which is also shown in FIG. 4 and described in more detail later.

In some implementations, the flow control subsystem 290 includes a flowmeter 293 and a control valve 295. The flowmeter 293 can be configured to measure a flow rate of the injection fluid stream 208. The control valve 295 can be configured to adjust a flow rate of the disposal stream 206. In some implementations, the controller 291 is communicatively coupled to the flowmeter 291 and the control valve 293. The controller 291 can be configured to adjust a position (percent opening) of the control valve 295 to adjust the flow rate of the disposal stream 206 based on the flow rate of the injection fluid stream 208 measured by the flowmeter 293. For example, the controller 291 receives the measured flow rate of the injection fluid stream 208 from the flowmeter 293. Based on the measured flow rate, the controller 291 can transmit a signal to the control valve 295 to adjust the percent opening of the control valve 295 to adjust the flow rate of the disposal stream 206 exiting the osmosis separator 201.

Figure 2C:
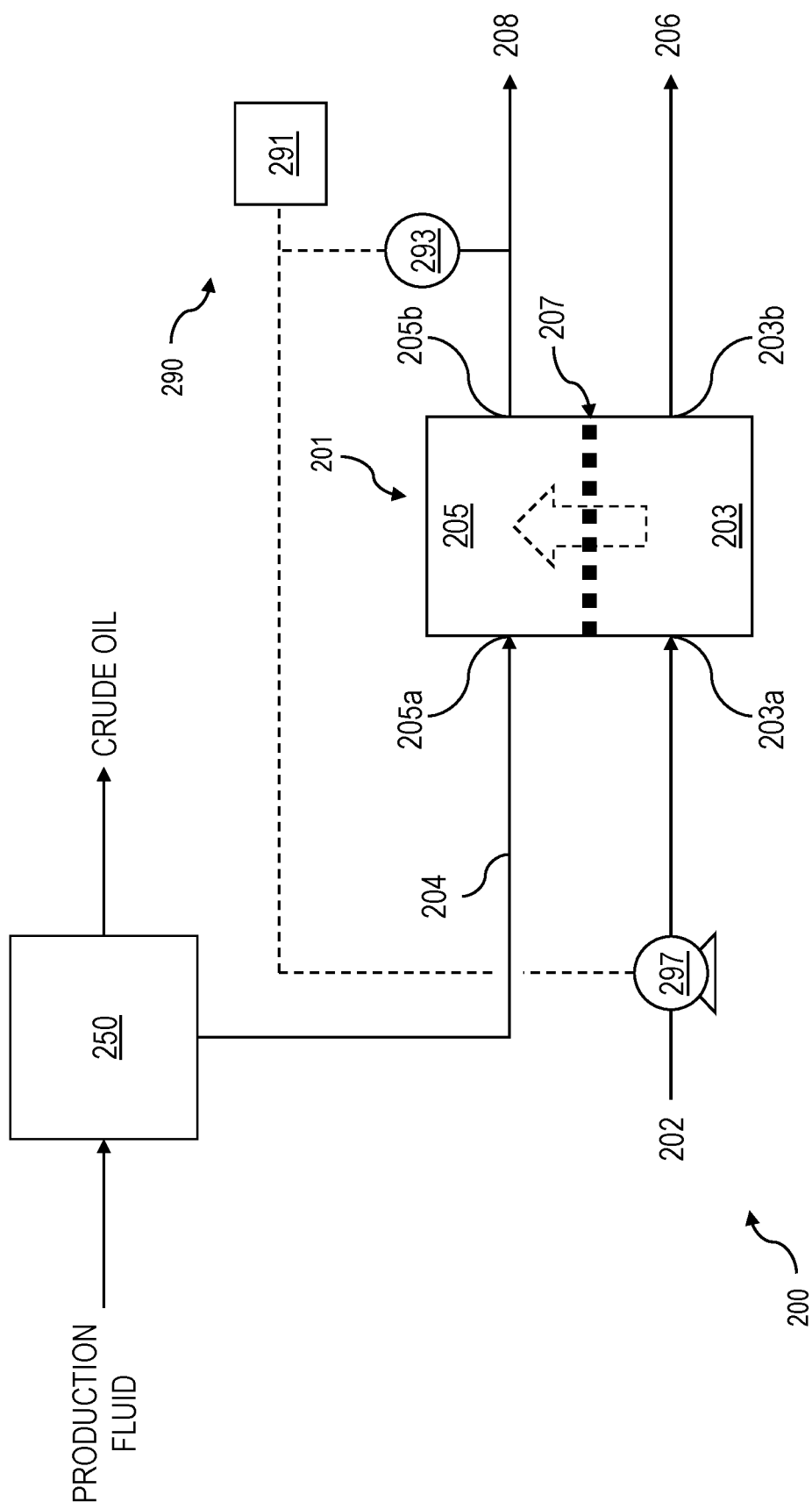
FIG. 2C is a schematic diagram of an example water treatment system to form an injection fluid that can be flowed to the well of FIG. 1A.

FIG. 2C depicts an implementation of the system 200 that includes the crude oil processing unit 250 and the flow control subsystem 290. Similar to the system 200 of FIG. 2B, the flow control subsystem 290 of FIG. 2C includes the flowmeter 293 configured to measure the flow rate of the injection fluid stream 208. In some implementations, the flow control subsystem 290 includes a pump 297 that is configured to flow the aqueous feed stream 202 to the feed inlet 203a of the feed compartment 203 of the osmosis separator 201. In some implementations, the pump 297 is a variable speed drive (VSD) pump. In some implementations, the controller 291 is communicatively coupled to the flowmeter 293 and the pump 297. The controller 291 can be configured to adjust a speed of the pump 297 to adjust the flow of the aqueous feed stream 202 to the feed inlet 203a of the feed compartment 203 based on the flow rate of the injection fluid stream 208 measured by the flowmeter 293. For example, the controller 291 receives the measured flow rate of the injection fluid stream 208 from the flowmeter 293. Based on the measured flow rate, the controller 291 can transmit a signal to the pump 297 to adjust the speed of the pump 297 to adjust a flow rate of the aqueous feed stream 202 to the feed inlet 203a of the feed compartment 203.

Figure 2D:
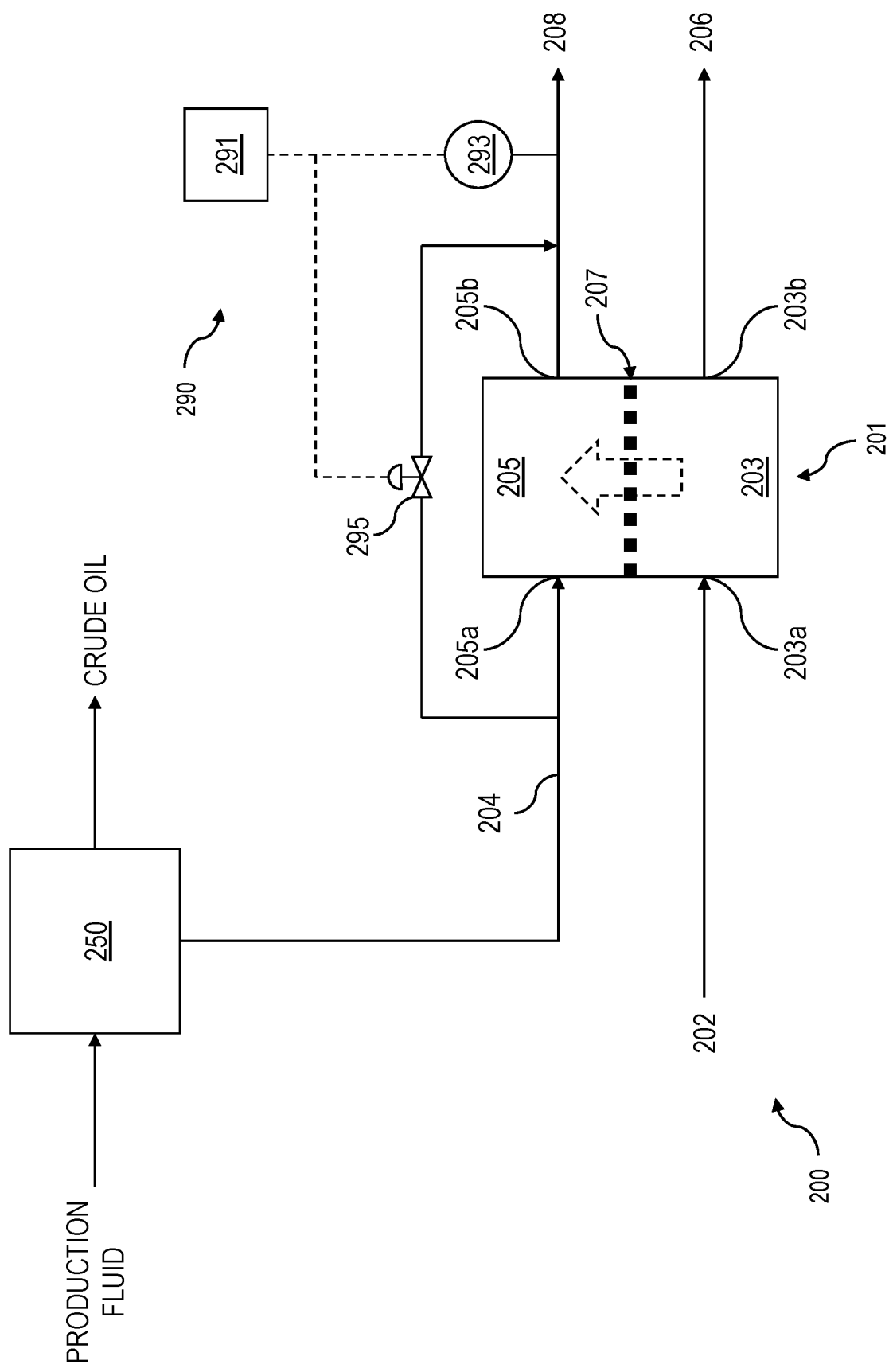
FIG. 2D is a schematic diagram of an example water treatment system to form an injection fluid that can be flowed to the well of FIG. 1A.

FIG. 2D depicts an implementation of the system 200 that includes the crude oil processing unit 250 and the flow control subsystem 290. Similar to the system 200 of FIG. 2B, the flow control subsystem 290 of FIG. 2D includes the flowmeter 293 configured to measure the flow rate of the injection fluid stream 208 and the control valve 295. In some implementations, at least a portion of the aqueous draw stream 204 bypasses the osmosis separator 201 and mixes with the injection fluid stream 208 before the injection fluid stream 208 is flowed to the subterranean formation. In some implementations, the control valve 295 is configured to adjust a flow rate of the portion of the aqueous draw stream 204 that bypasses the osmosis separator 201. Similar to that of the flow control subsystem 290 of FIG. 2B, the controller 291 is communicatively coupled to the flowmeter 293 and the control valve 295. The controller 291 can be configured to adjust a position (percent opening) of the control valve 295 to adjust the flow rate of the portion of the aqueous draw stream 204 that bypasses the osmosis separator 201 based on the flow rate of the injection fluid stream 208 measured by the flowmeter 293. For example, the controller 291 receives the measured flow rate of the injection fluid stream 208 from the flowmeter 293. Based on the measured flow rate, the controller 291 can transmit a signal to the control valve 295 to adjust the percent opening of the control valve 295 to adjust the flow rate of the portion of the aqueous draw stream 204 that bypasses the osmosis separator 201.

Figure 2E:
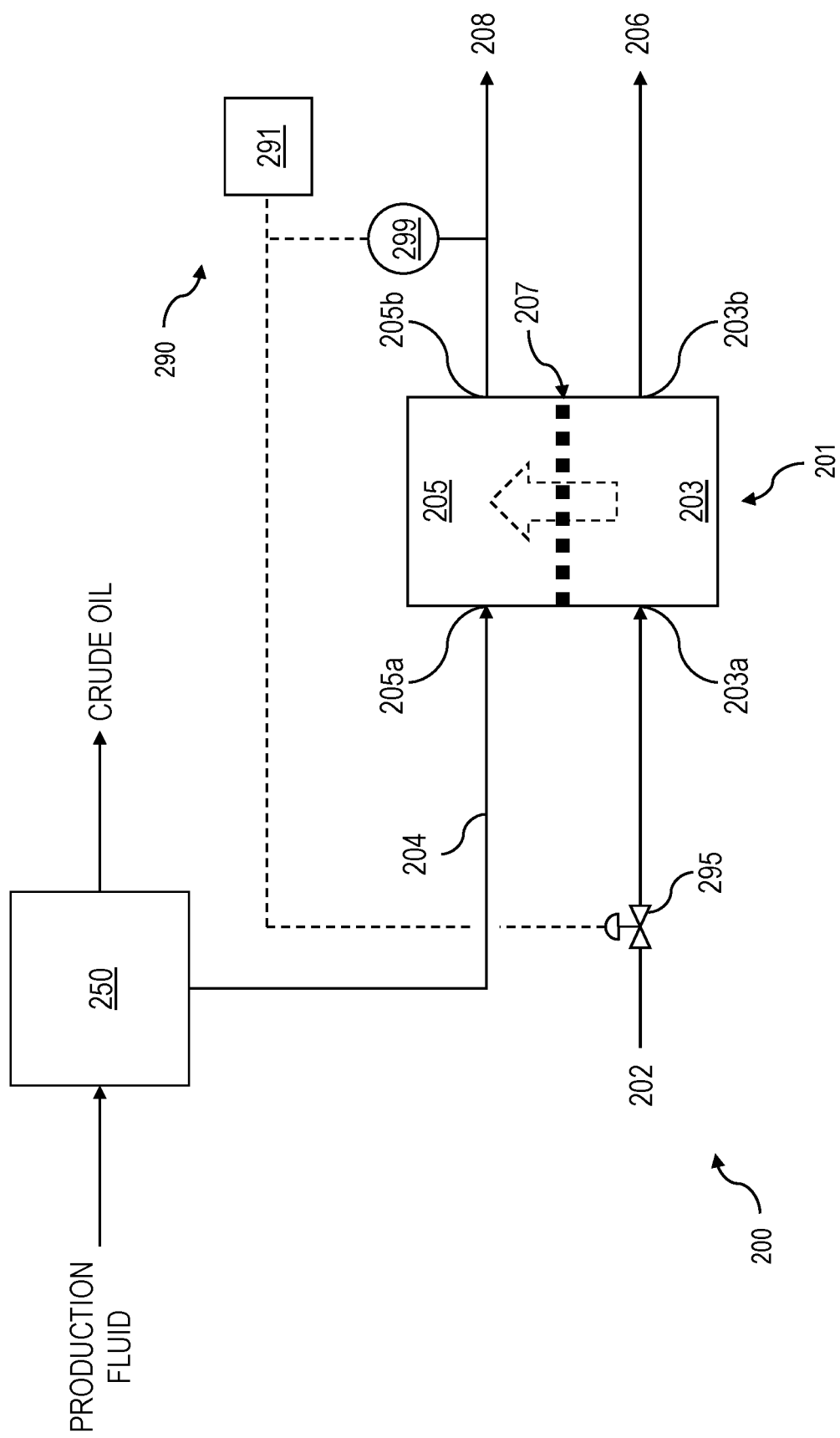
FIG. 2E is a schematic diagram of an example water treatment system to form an injection fluid that can be flowed to the well of FIG. 1A.

FIG. 2E depicts an implementation of the system 200 that includes the crude oil processing unit 250 and the flow control subsystem 290. Similar to the system 200 of FIG. 2B, the flow control subsystem 290 of FIG. 2E includes the control valve 295. In some implementations, the control valve 295 is configured to the aqueous feed stream 202 to the feed inlet 203a of the feed compartment 203 of the osmosis separator 201. In some implementations, the flow control subsystem 290 includes a TDS meter 299. The TDS meter 299 can be configured to measure a TDS level of the injection fluid stream 208. Similar to that of the flow control subsystem 290 of FIG. 2B, the controller 291 is communicatively coupled to the TDS meter 299 and the control valve 295. The controller 291 can be configured to adjust a position (percent opening) of the control valve 295 to adjust the flow rate of the aqueous feed stream 202 to the feed inlet 203a of the feed compartment 203 based on the TDS level of the injection fluid stream 208 measured by the TDS meter 299. For example, the controller 291 receives the measured TDS level of the injection fluid stream 208 from the TDS meter 299. Based on the measured TDS level, the controller 291 can transmit a signal to the control valve 295 to adjust the percent opening of the control valve 295 to adjust the flow rate of the aqueous feed stream 202 to the feed inlet 203a of the feed compartment 203.

Figure 2F:
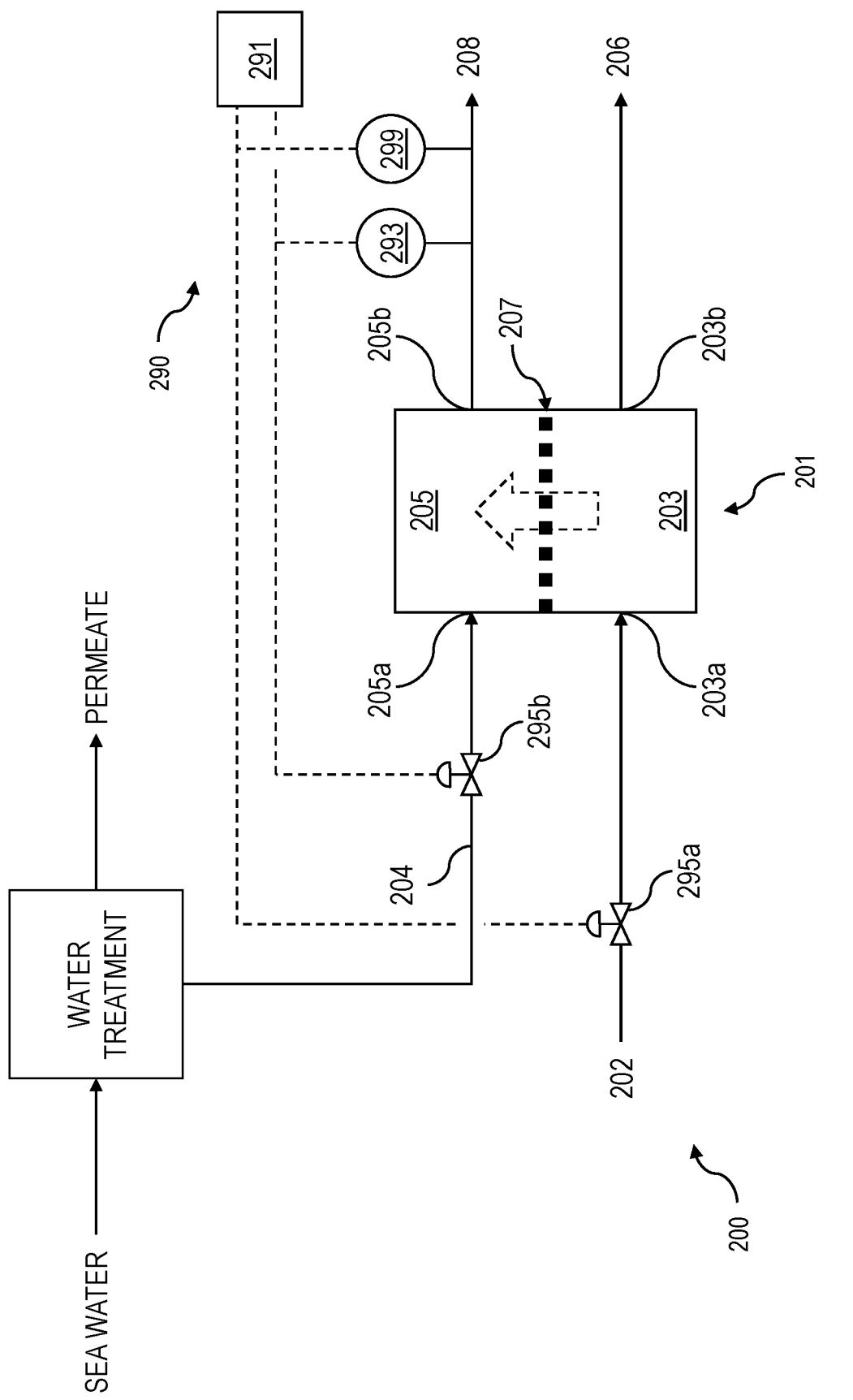
FIG. 2F is a schematic diagram of an example water treatment system to form an injection fluid that can be flowed to the well of FIG. 1A.

FIG. 2F depicts an implementation of the system 200 in which the aqueous feed stream 202 is TSE. In some implementations, the aqueous draw stream 204 includes seawater. In some implementations, the aqueous draw stream 204 is a stream from a water treatment unit. For example, the water treatment unit includes a reverse osmosis separator which receives seawater and produces a permeate stream (low TDS) and a concentrate stream (high TDS), and the aqueous draw stream 204 is the concentrate stream.

Similar to the system 200 of FIG. 2E, the system 200 includes the flow control subsystem 290 that includes a control valve 295a and the TDS meter 299. The control valve 295a is configured to adjust the flow rate of the aqueous feed stream 202 to the feed inlet 203a of the feed compartment 203, and the TDS meter 299 is configured to measure the TDS level of the injection fluid stream 208. Similar to that of the flow control subsystem 290 of FIG. 2E, the controller 291 is communicatively coupled to the TDS meter 299 and the control valve 295a. The controller 291 can be configured to adjust a position (percent opening) of the control valve 295a to adjust the flow rate of the aqueous feed stream 202 to the feed inlet 203a of the feed compartment 203 based on the TDS level of the injection fluid stream 208 measured by the TDS meter 299. For example, the controller 291 receives the measured TDS level of the injection fluid stream 208 from the TDS meter 299. Based on the measured TDS level, the controller 291 can transmit a signal to the control valve 295a to adjust the percent opening of the control valve 295a to adjust the flow rate of the aqueous feed stream 202 to the feed inlet 203a of the feed compartment 203.

Similar to the system 200 of FIG. 2B, the flow control subsystem 290 of FIG. 2F includes the flowmeter 293 configured to measure the flow rate of the injection fluid stream 208. In some implementations, the flow control subsystem 290 includes a control valve 295b. The control valve 295b is configured to adjust the flow rate of the aqueous draw stream 204 to the draw inlet 205a of the draw compartment 205 of the osmosis separator 201. Similar to that of the flow control subsystem 290 of FIG. 2B, the controller 291 is communicatively coupled to the flowmeter 293 and the control valve 295b. The controller 291 can be configured to adjust a position (percent opening) of the control valve 295b to adjust the flow rate of the aqueous draw stream 204 to the draw inlet 205a of the draw compartment 205 based on the flow rate of the injection fluid stream 208 measured by the flowmeter 293. For example, the controller 291 receives the measured flow rate of the injection fluid stream 208 from the flowmeter 293. Based on the measured flow rate, the controller 291 can transmit a signal to the control valve 295b to adjust the percent opening of the control valve 295b to adjust the flow rate of aqueous draw stream 204 to the draw inlet 205a of the draw compartment 205.

Figure 2G:
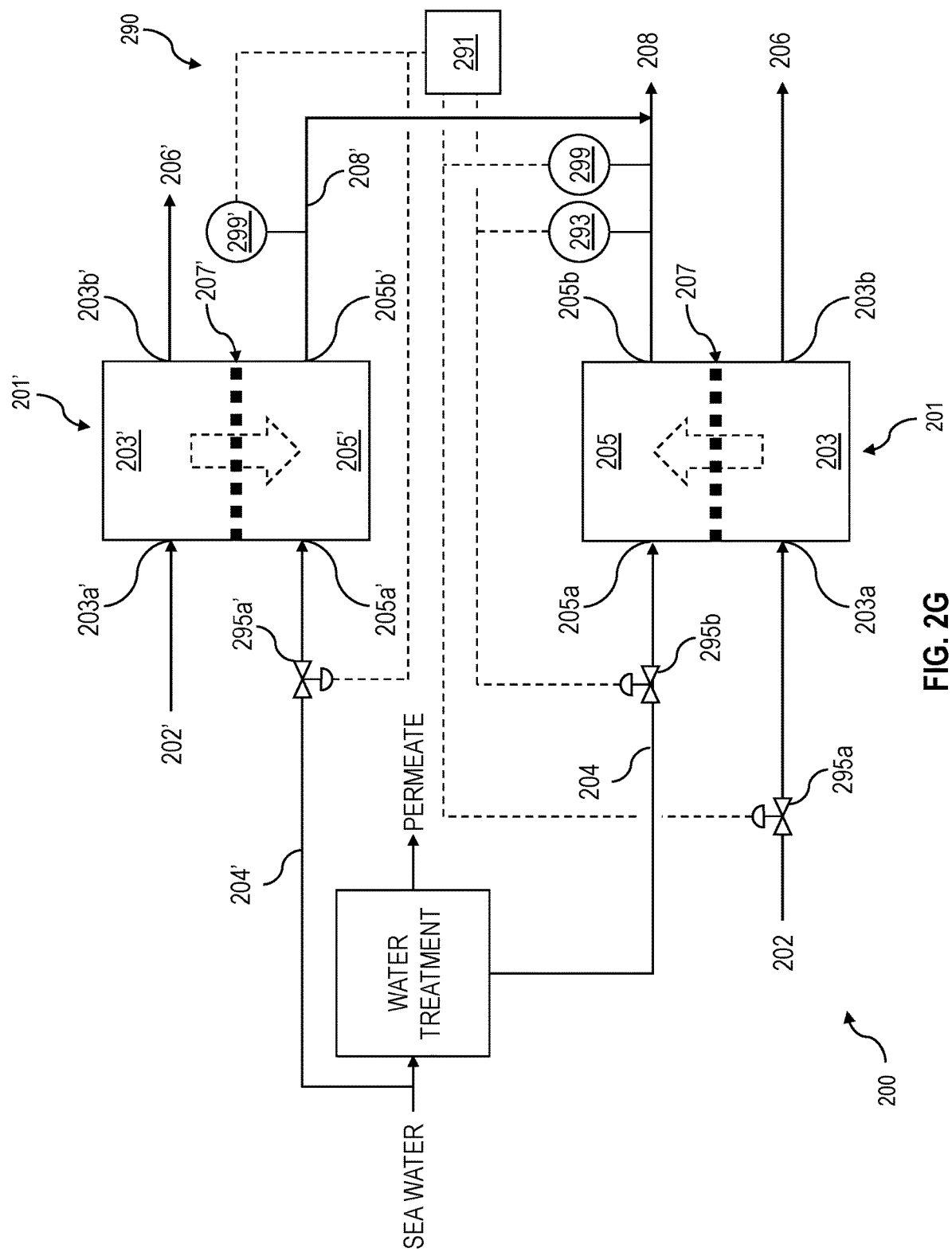
FIG. 2G is a schematic diagram of an example water treatment system to form an injection fluid that can be flowed to the well of FIG. 1A.

FIG. 2G depicts an implementation of the system 200 that includes multiple osmosis separators 201 (labeled as 201 and 201'). The second osmosis separator 201' can be substantially the same as the first osmosis separator 201. In some implementations, the osmosis separator 201 and the second osmosis separator 201' are in a parallel configuration (as shown in FIG. 2G).

Similar to the system 200 of FIG. 2F, the aqueous feed stream 202 can be TSE, and aqueous draw stream 204 can be the concentrate stream from the water treatment unit. Similar to the system 200 of FIG. 2F, the system 200 includes the flow control subsystem 290 including the flowmeter 293, the control valve 295a, the control valve 295b, and the TDS meter 299.

The control valve 295a is configured to adjust the flow rate of the aqueous feed stream 202 to the feed inlet 203a of the feed compartment 203, and the TDS meter 299 is configured to measure the TDS level of the injection fluid stream 208. Similar to that of the flow control subsystem 290 of FIG. 2F, the controller 291 is communicatively coupled to the TDS meter 299 and the control valve 295a. The controller 291 can be configured to adjust a position (percent opening) of the control valve 295a to adjust the flow rate of the aqueous feed stream 202 to the feed inlet 203a of the feed compartment 203 based on the TDS level of the injection fluid stream 208 measured by the TDS meter 299. For example, the controller 291 receives the measured TDS level of the injection fluid stream 208 from the TDS meter 299. Based on the measured TDS level, the controller 291 can transmit a signal to the control valve 295a to adjust the percent opening of the control valve 295a to adjust the flow rate of the aqueous feed stream 202 to the feed inlet 203a of the feed compartment 203.

The flowmeter 293 is configured to measure the flow rate of the injection fluid stream 208. The control valve 295b is configured to adjust the flow rate of the aqueous draw stream 204 to the draw inlet 205a of the draw compartment 205 of the osmosis separator 201. Similar to that of the flow control subsystem 290 of FIG. 2F, the controller 291 is communicatively coupled to the flowmeter 293 and the control valve 295b. The controller 291 can be configured to adjust a position (percent opening) of the control valve 295b to adjust the flow rate of the aqueous draw stream 204 to the draw inlet 205a of the draw compartment 205 based on the flow rate of the injection fluid stream 208 measured by the flowmeter 293. For example, the controller 291 receives the measured flow rate of the injection fluid stream 208 from the flowmeter 293. Based on the measured flow rate, the controller 291 can transmit a signal to the control valve 295b to adjust the percent opening of the control valve 295b to adjust the flow rate of aqueous draw stream 204 to the draw inlet 205a of the draw compartment 205.

In some implementations, TSE flows to a second feed inlet 203a' of a second feed compartment 203' of the second osmosis separator 201' as a second aqueous feed stream 202'. In some implementations, a portion of the seawater flows to a second draw inlet 205a' of a second draw compartment 205' of the second osmosis separator 201' as a second aqueous draw stream 204'. The second aqueous feed stream 202' has a third TDS level, and the second aqueous draw stream 204' has a fourth TDS level that is greater than the third TDS level of the second aqueous feed stream 202'. In some implementations, the fourth TDS level of the second aqueous draw stream 204' is at least 150% of the third TDS level of the second aqueous feed stream 202'. In some implementations, the osmotic pressure of the second aqueous draw stream 204' is at least 150% of the osmotic pressure of the second aqueous feed stream 202'.

A second membrane 207' of the second osmosis separator 201' is configured to allow passage of water between the feed compartment 203 and the draw compartment 205 through the second membrane 207' based on a difference between the third TDS level of the second aqueous feed stream 202' and the fourth TDS level of the second aqueous draw stream 204'. Because the fourth TDS level of the second aqueous draw stream 204' is greater than the third TDS level of the second aqueous feed stream 202', the second aqueous draw stream 204' has a greater osmotic pressure than the second aqueous feed stream 202'. Water preferentially flows from second aqueous feed stream 202' in the second feed compartment 203' through the second membrane 207' to the second aqueous draw stream 204' in the second draw compartment 205' (depicted by dotted arrow). In some implementations, within the second osmosis separator 201', water transfers out of the second aqueous feed stream 202' to form a second disposal stream 206', and water transfers into the second aqueous draw stream 204' to form a second injection fluid stream 208'.

A second disposal outlet 203b' of the second feed compartment 203' is configured to discharge the second disposal stream 206' from the second feed compartment 203'. A second injection fluid outlet 205b' of the second draw compartment 205' is configured to discharge the second injection fluid stream 208' from the second draw compartment 205'. The second disposal stream 206' exiting the second osmosis separator 201' has a greater concentration of TDS in comparison to the second aqueous feed stream 202' entering the second osmosis separator 201'. The second injection fluid stream 208' exiting the second osmosis separator 201' has a smaller concentration of TDS in comparison to the second aqueous draw stream 204' entering the second osmosis separator 201'. In effect, the second aqueous feed stream 202' is used to dilute the second aqueous draw stream 204'.

The second disposal stream 206' can be disposed. The second injection fluid stream 208' can be flowed to a subterranean formation (for example, using the injection well 100 of FIG. 1A). In some implementations, the second injection fluid stream 208' is processed before it is flowed to the subterranean formation. In some implementations, the injection fluid stream 208 and the second injection fluid stream 208' are combined and flow together to the subterranean formation.

In some implementations, the flow control subsystem 290 includes a second control valve 295a' and a second TDS meter 299'. The second control valve 295a' is configured to adjust the flow rate of the second aqueous feed stream 202' to the second feed inlet 203a' of the second feed compartment 203', and the second TDS meter 299' is configured to measure the TDS level of the second injection fluid stream 208'. Similar to that of the flow control subsystem 290 of FIG. 2E, the controller 291 is communicatively coupled to the second TDS meter 299' and the second control valve 295a'. The controller 291 can be configured to adjust a position (percent opening) of the second control valve 295a' to adjust the flow rate of the second aqueous feed stream 202' to the second feed inlet 203a' of the second feed compartment 203' based on the TDS level of the second injection fluid stream 208' measured by the second TDS meter 299'. For example, the controller 291 receives the measured TDS level of the second injection fluid stream 208' from the second TDS meter 299'. Based on the measured TDS level, the controller 291 can transmit a signal to the second control valve 295a' to adjust the percent opening of the second control valve 295a' to adjust the flow rate of the second aqueous feed stream 202' to the second feed inlet 203a' of the second feed compartment 203'.

In some implementations, the flow control subsystem 290 includes a second flowmeter 293' and a third control valve 295b'. The second flowmeter 293' is configured to measure the flow rate of the second injection fluid stream 208'. The third control valve 295b' is configured to adjust the flow rate of the second aqueous draw stream 204' to the second draw inlet 205a' of the second draw compartment 205' of the second osmosis separator 201'. Similar to that of the flow control subsystem 290 of FIG. 2F, the controller 291 is communicatively coupled to the second flowmeter 293' and the third control valve 295b'. The controller 291 can be configured to adjust a position (percent opening) of the third control valve 295b' to adjust the flow rate of the second aqueous draw stream 204' to the second draw inlet 205a' of the second draw compartment 205' based on the flow rate of the second injection fluid stream 208' measured by the second flowmeter 293'. For example, the controller 291 receives the measured flow rate of the second injection fluid stream 208' from the second flowmeter 293'. Based on the measured flow rate, the controller 291 can transmit a signal to the third control valve 295b' to adjust the percent opening of the third control valve 295b' to adjust the flow rate of the second aqueous draw stream 204' to the second draw inlet 205a' of the second draw compartment 205'.

Figure 2H:
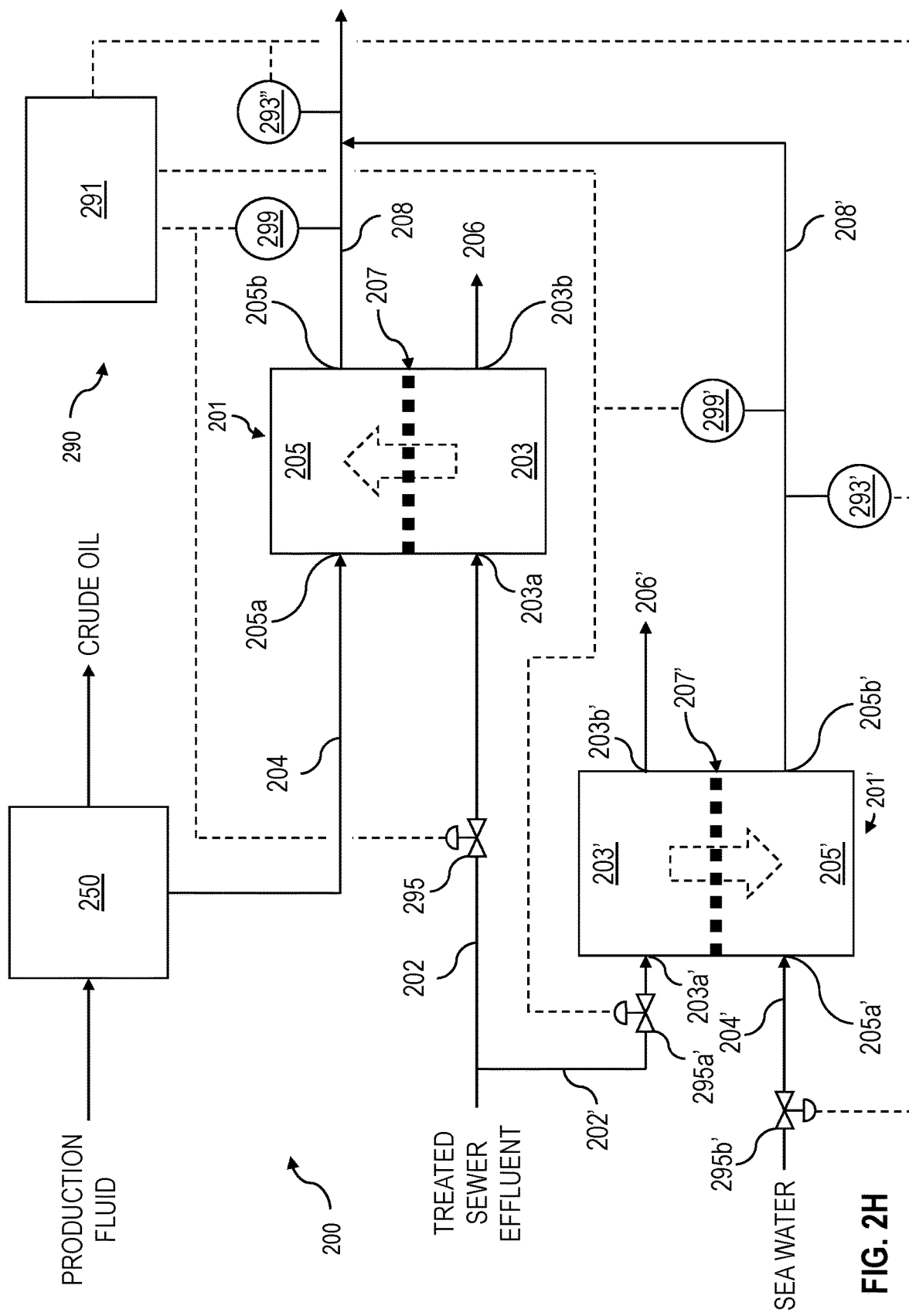
FIG. 2H is a schematic diagram of an example water treatment system to form an injection fluid that can be flowed to the well of FIG. 1A.

FIG. 2H depicts an implementation of the system 200 that includes the second osmosis separator 201', the crude oil processing unit 250, the flow control subsystem 290. As mentioned previously, in some implementations, the water separated from the hydrocarbons by the crude oil processing unit 250 is used as the aqueous draw stream 204 flowing to the draw compartment 205 of the osmosis separator 201. In some implementations, a first portion of TSE is used as the aqueous feed stream 202 flowing to the feed compartment 203 of the osmosis separator 201. In some implementations, a second portion of TSE is used as the second aqueous feed stream 202' flowing to the second feed compartment 203' of the second osmosis separator 201'. In some implementations, seawater is used as the second aqueous draw stream 204' flowing to the second draw compartment 205' of the second osmosis separator 201'.

Similar to the flow control subsystem 290 of FIG. 2E, the control valve 295a is configured to adjust the flow rate of the aqueous feed stream 202 to the feed inlet 203a of the feed compartment 203, and the TDS meter 299 is configured to measure the TDS level of the injection fluid stream 208. Similar to that of the flow control subsystem 290 of FIG. 2E, the controller 291 is communicatively coupled to the TDS meter 299 and the control valve 295a. The controller 291 can be configured to adjust a position (percent opening) of the control valve 295a to adjust the flow rate of the aqueous feed stream 202 to the feed inlet 203a of the feed compartment 203 based on the TDS level of the injection fluid stream 208 measured by the TDS meter 299. For example, the controller 291 receives the measured TDS level of the injection fluid stream 208 from the TDS meter 299. Based on the measured TDS level, the controller 291 can transmit a signal to the control valve 295a to adjust the percent opening of the control valve 295a to adjust the flow rate of the aqueous feed stream 202 to the feed inlet 203a of the feed compartment 203.

Similar to the flow control subsystem 290 of FIG. 2G, the second control valve 295a' is configured to adjust the flow rate of the second aqueous feed stream 202' to the second feed inlet 203a' of the second feed compartment 203', and the second TDS meter 299' is configured to measure the TDS level of the second injection fluid stream 208'. Similar to that of the flow control subsystem 290 of FIG. 2G, the controller 291 is communicatively coupled to the second TDS meter 299' and the second control valve 295a'. The controller 291 can be configured to adjust a position (percent opening) of the second control valve 295a' to adjust the flow rate of the second aqueous feed stream 202' to the second feed inlet 203a' of the second feed compartment 203' based on the TDS level of the second injection fluid stream 208' measured by the second TDS meter 299'. For example, the controller 291 receives the measured TDS level of the second injection fluid stream 208' from the second TDS meter 299'. Based on the measured TDS level, the controller 291 can transmit a signal to the second control valve 295a' to adjust the percent opening of the second control valve 295a' to adjust the flow rate of the second aqueous feed stream 202' to the second feed inlet 203a' of the second feed compartment 203'.

Similar to the flow control subsystem 290 of FIG. 2G, the second flowmeter 293' is configured to measure the flow rate of the second injection fluid stream 208'. The third control valve 295b' is configured to adjust the flow rate of the second aqueous draw stream 204' to the second draw inlet 205a' of the second draw compartment 205' of the second osmosis separator 201'. Similar to that of the flow control subsystem 290 of FIG. 2G, the controller 291 is communicatively coupled to the second flowmeter 293' and the third control valve 295b'. The controller 291 can be configured to adjust a position (percent opening) of the third control valve 295b' to adjust the flow rate of the second aqueous draw stream 204' to the second draw inlet 205a' of the second draw compartment 205' based on the flow rate of the second injection fluid stream 208' measured by the second flowmeter 293'. In some implementations, the flow control subsystem 290 includes a third flowmeter 293" configured to measure a combined flow rate of the injection fluid stream 208 and the second injection fluid stream 208'. The controller 291 can be communicatively coupled to the third flowmeter 293". In some implementations, the controller 291 can be configured to adjust the position (percent opening) of the third control valve 295b' to adjust the flow rate of the second aqueous draw stream 204' to the second draw inlet 205a' of the second draw compartment 205' based on the combined flow rate of the injection fluid stream 208 and the second injection fluid stream 208' measured by the third flowmeter 293".

For example, the controller 291 receives the measured flow rate of the second injection fluid stream 208' from the second flowmeter 293' and/or the measured flow rate of the combined injection fluid stream 208 and the second injection fluid stream 208' from the third flowmeter 293". Based on the measured flow rate, the controller 291 can transmit a signal to the third control valve 295b' to adjust the percent opening of the third control valve 295b' to adjust the flow rate of the second aqueous draw stream 204' to the second draw inlet 205a' of the second draw compartment 205'.

Figure 2J:
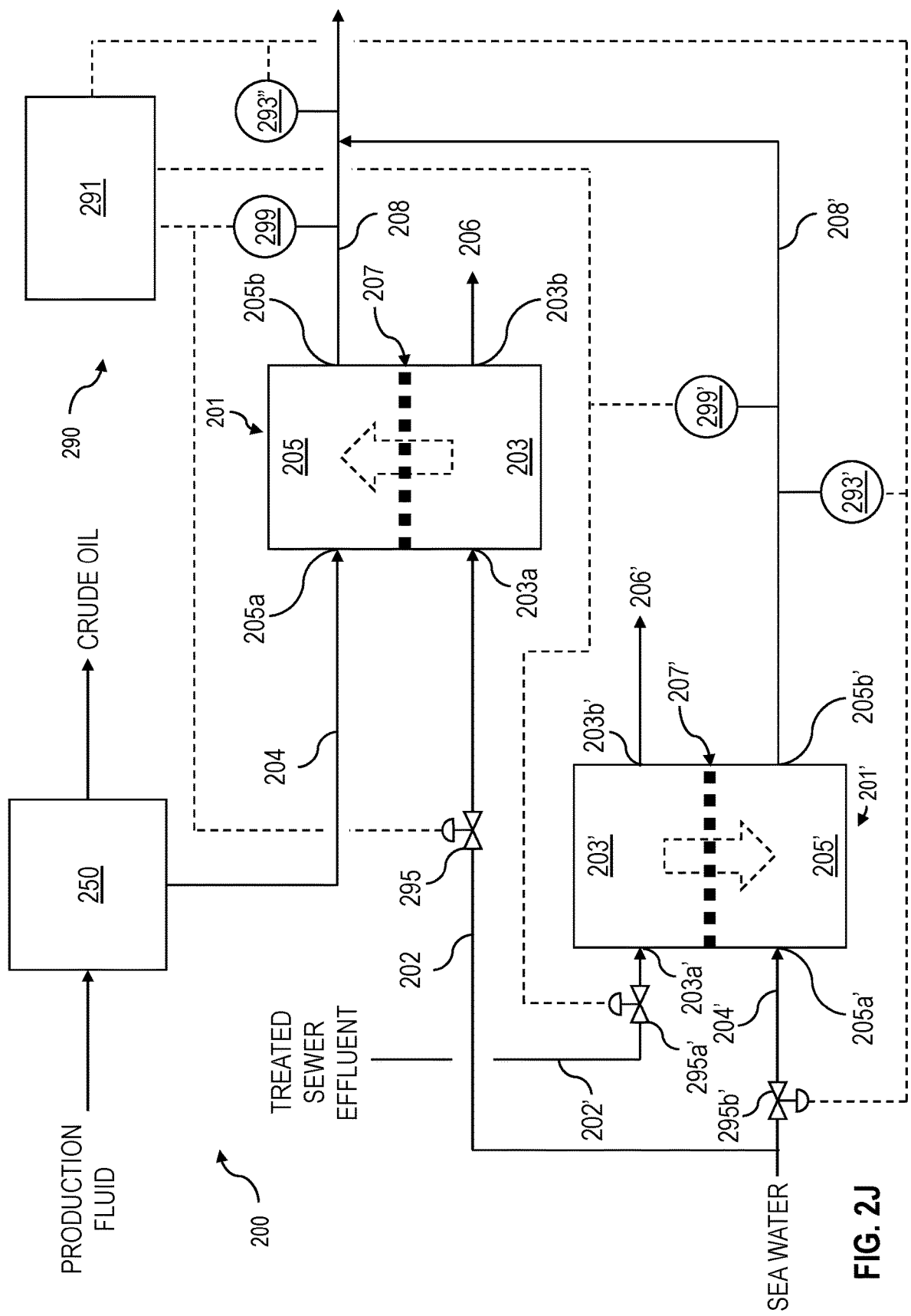
FIG. 2J is a schematic diagram of an example water treatment system to form an injection fluid that can be flowed to the well of FIG. 1A.

FIG. 2J depicts an implementation of the system 200 that includes the second osmosis separator 201', the crude oil processing unit 250, the flow control subsystem 290. As mentioned previously, in some implementations, the water separated from the hydrocarbons by the crude oil processing unit 250 is used as the aqueous draw stream 204 flowing to the draw compartment 205 of the osmosis separator 201. In some implementations, a first portion of seawater is used as the aqueous feed stream 202 flowing to the feed compartment 203 of the osmosis separator 201. In some implementations, a second portion of seawater is used as the second aqueous draw stream 204' flowing to the second draw compartment 205' of the second osmosis separator 201'. In some implementations, TSE is used as the second aqueous feed stream 202' flowing to the second feed compartment 203' of the second osmosis separator 201'.

Similar to the flow control subsystem 290 of FIG. 2H, the control valve 295a is configured to adjust the flow rate of the aqueous feed stream 202 to the feed inlet 203a of the feed compartment 203, and the TDS meter 299 is configured to measure the TDS level of the injection fluid stream 208. Similar to that of the flow control subsystem 290 of FIG. 2E, the controller 291 is communicatively coupled to the TDS meter 299 and the control valve 295a. The controller 291 can be configured to adjust a position (percent opening) of the control valve 295a to adjust the flow rate of the aqueous feed stream 202 to the feed inlet 203a of the feed compartment 203 based on the TDS level of the injection fluid stream 208 measured by the TDS meter 299. For example, the controller 291 receives the measured TDS level of the injection fluid stream 208 from the TDS meter 299. Based on the measured TDS level, the controller 291 can transmit a signal to the control valve 295a to adjust the percent opening of the control valve 295a to adjust the flow rate of the aqueous feed stream 202 to the feed inlet 203a of the feed compartment 203.

Similar to the flow control subsystem 290 of FIG. 2H, the second control valve 295a' is configured to adjust the flow rate of the second aqueous feed stream 202' to the second feed inlet 203a' of the second feed compartment 203', and the second TDS meter 299' is configured to measure the TDS level of the second injection fluid stream 208'. Similar to that of the flow control subsystem 290 of FIG. 2H, the controller 291 is communicatively coupled to the second TDS meter 299' and the second control valve 295a'. The controller 291 can be configured to adjust a position (percent opening) of the second control valve 295a' to adjust the flow rate of the second aqueous feed stream 202' to the second feed inlet 203a' of the second feed compartment 203' based on the TDS level of the second injection fluid stream 208' measured by the second TDS meter 299'. For example, the controller 291 receives the measured TDS level of the second injection fluid stream 208' from the second TDS meter 299'. Based on the measured TDS level, the controller 291 can transmit a signal to the second control valve 295a' to adjust the percent opening of the second control valve 295a' to adjust the flow rate of the second aqueous feed stream 202' to the second feed inlet 203a' of the second feed compartment 203'.

Similar to the flow control subsystem 290 of FIG. 2H, the second flowmeter 293' is configured to measure the flow rate of the second injection fluid stream 208'. The third control valve 295b' is configured to adjust the flow rate of the second aqueous draw stream 204' to the second draw inlet 205a' of the second draw compartment 205' of the second osmosis separator 201'. Similar to that of the flow control subsystem 290 of FIG. 2H, the controller 291 is communicatively coupled to the second flowmeter 293' and the third control valve 295b'. The controller 291 can be configured to adjust a position (percent opening) of the third control valve 295b' to adjust the flow rate of the second aqueous draw stream 204' to the second draw inlet 205a' of the second draw compartment 205' based on the flow rate of the second injection fluid stream 208' measured by the second flowmeter 293'. Similar to the flow control subsystem 290 of FIG. 2H, the third flowmeter 293" is configured to measure a combined flow rate of the injection fluid stream 208 and the second injection fluid stream 208'. The controller 291 can be communicatively coupled to the third flowmeter 293". In some implementations, the controller 291 can be configured to adjust the position (percent opening) of the third control valve 295b' to adjust the flow rate of the second aqueous draw stream 204' to the second draw inlet 205a' of the second draw compartment 205' based on the combined flow rate of the injection fluid stream 208 and the second injection fluid stream 208' measured by the third flowmeter 293".

For example, the controller 291 receives the measured flow rate of the second injection fluid stream 208' from the second flowmeter 293' and/or the measured flow rate of the combined injection fluid stream 208 and the second injection fluid stream 208' from the third flowmeter 293". Based on the measured flow rate, the controller 291 can transmit a signal to the third control valve 295b' to adjust the percent opening of the third control valve 295b' to adjust the flow rate of the second aqueous draw stream 204' to the second draw inlet 205a' of the second draw compartment 205'.

Figure 2K:
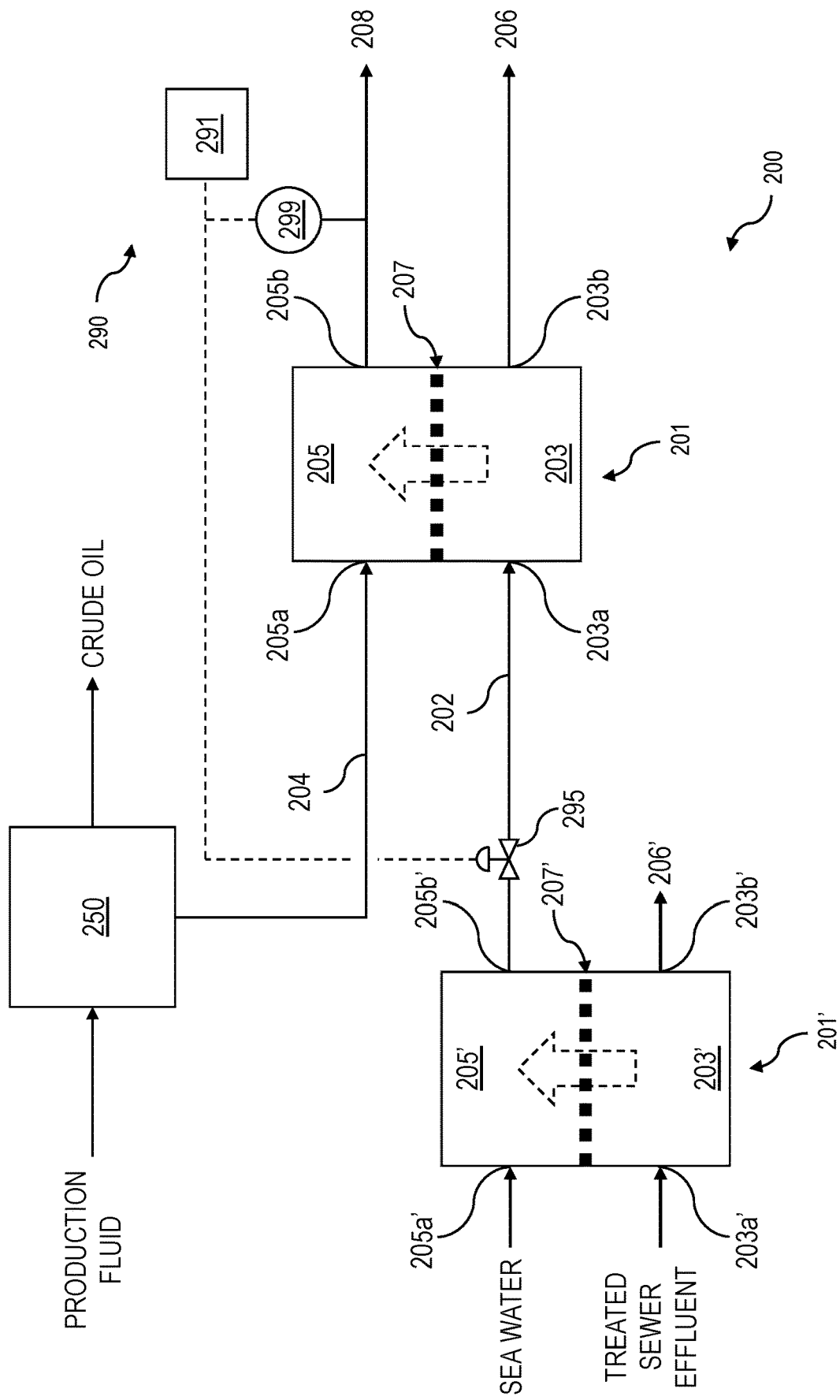
FIG. 2K is a schematic diagram of an example water treatment system to form an injection fluid that can be flowed to the well of FIG. 1A.

FIG. 2K depicts an implementation of the system 200 that includes the second osmosis separator 201', the crude oil processing unit 250, the flow control subsystem 290. In some implementations, the osmosis separator 201 and the second osmosis separator 201' are in a series configuration (as shown in FIG. 2K). As mentioned previously, in some implementations, the water separated from the hydrocarbons by the crude oil processing unit 250 is used as the aqueous draw stream 204 flowing to the draw compartment 205 of the osmosis separator 201. In some implementations, seawater is used as the second aqueous draw stream 204' flowing to the second draw compartment 205' of the second osmosis separator 201'. In some implementations, TSE is used as the second aqueous feed stream 202' flowing to the second feed compartment 203' of the second osmosis separator 201'. In some implementations, the stream exiting the second draw compartment 205' of the second osmosis separator 201' (previously referred to as the second injection fluid stream 208') is used as the aqueous feed stream 202 flowing to the feed compartment 203 of the osmosis separator 201.

Similar to the system 200 of FIG. 2E, the system 200 includes the flow control subsystem 290 that includes a control valve 295a and the TDS meter 299. The control valve 295a is configured to adjust the flow rate of the aqueous feed stream 202 to the feed inlet 203a of the feed compartment 203, and the TDS meter 299 is configured to measure the TDS level of the injection fluid stream 208. Similar to that of the flow control subsystem 290 of FIG. 2E, the controller 291 is communicatively coupled to the TDS meter 299 and the control valve 295a. The controller 291 can be configured to adjust a position (percent opening) of the control valve 295a to adjust the flow rate of the aqueous feed stream 202 to the feed inlet 203a of the feed compartment 203 based on the TDS level of the injection fluid stream 208 measured by the TDS meter 299. For example, the controller 291 receives the measured TDS level of the injection fluid stream 208 from the TDS meter 299. Based on the measured TDS level, the controller 291 can transmit a signal to the control valve 295a to adjust the percent opening of the control valve 295a to adjust the flow rate of the aqueous feed stream 202 to the feed inlet 203a of the feed compartment 203.

Figure 2L:
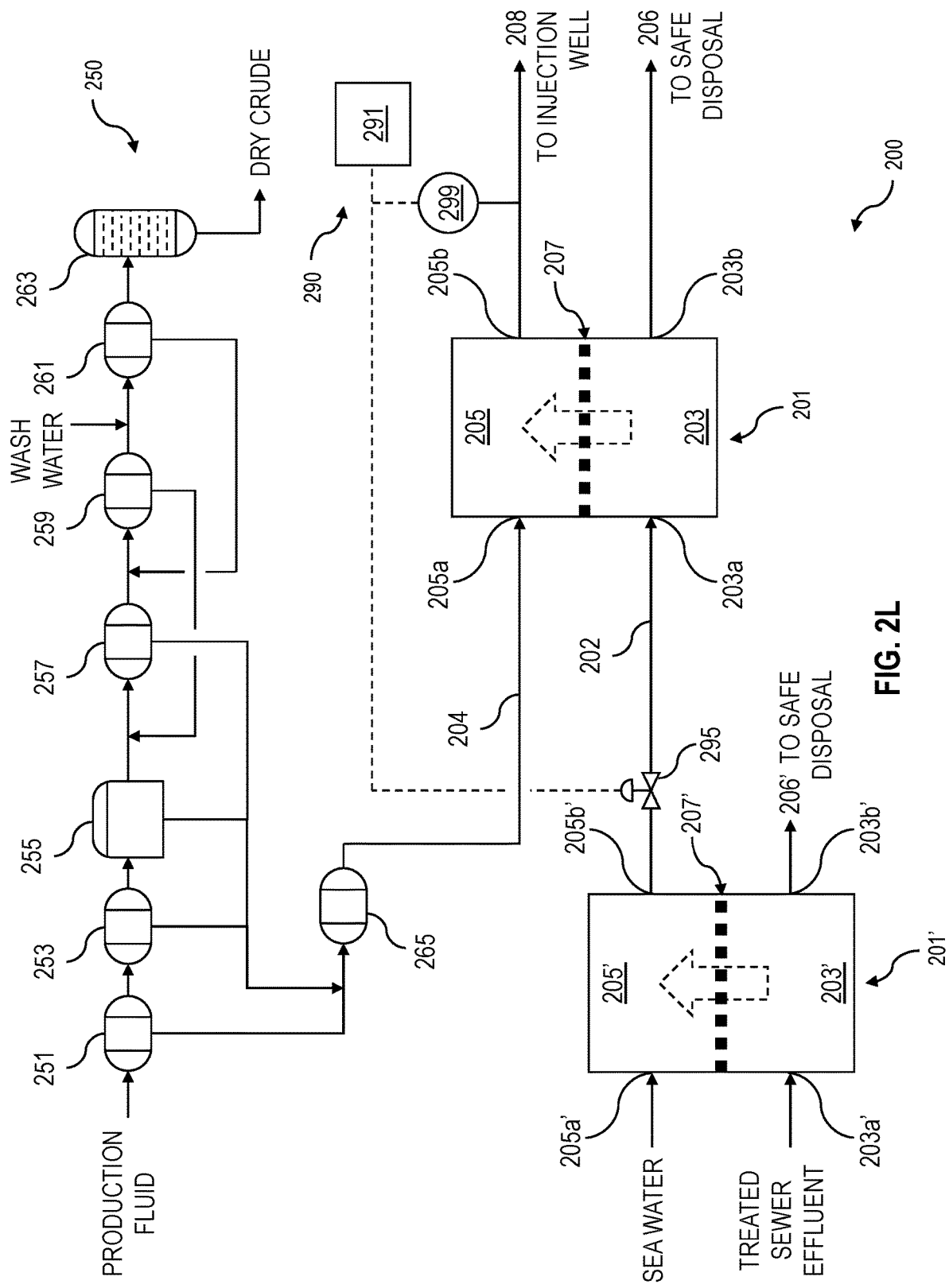
FIG. 2L is a schematic diagram of an example water treatment system to form an injection fluid that can be flowed to the well of FIG. 1A.

FIG. 2L depicts the implementation of system 200 in FIG. 2K but also shows additional details of the crude oil processing unit 250. The crude oil processing unit 250 separates water, salt, and vapors from the wet crude produced from a well (for example, the production well 100 of FIG. 1B) to produce a dry crude oil product. In some implementations, the crude oil processing unit 250 is configured to produce a dry crude oil product having a salt content of at most 10 pounds per 1,000 barrels. In some implementations, the crude oil processing unit 250 is configured to produce a dry crude oil product having a basic sediment and water (BS&W) content of at most 0.3 volume percent (vol. %). In some implementations, the crude oil processing unit 250 is configured to produce a dry crude oil product having a hydrogen sulfide content of less than 60 parts per million (ppm). In some implementations, the crude oil processing unit 250 is configured to produce a dry crude oil product having a Reid vapor pressure (RVP) of at most 7 pounds per square inch absolute (psia) and a true vapor pressure (TVP) of at most 13.5 psia at 130 degrees Fahrenheit (° F.).

In some implementations, the crude oil processing unit 250 includes a high pressure production trap 251. In some implementations, the crude oil processing unit 250 includes a low pressure production trap 253. In some implementations, the crude oil processing unit 250 includes a low pressure degassing tank 255. In some implementations, the crude oil processing unit 250 includes a dehydrator 257. In some implementations, the crude oil processing unit 250 includes a $1^{st}$ stage desalter 259. In some implementations, the crude oil processing unit 250 includes a $2^{nd}$ stage desalter 261. In some implementations, the crude oil processing unit 250 includes a stabilizer column 263. In some implementations, the crude oil processing unit 250 includes a water/oil separation unit 265.

Wet crude from a production well (for example, the production well 100 of FIG. 1B) flows to the high pressure production trap 251. The high pressure production trap 251 is a three-phase separator and removes a majority of the vapors and water from the crude oil. In some implementations, the operating pressure of the high pressure production trap 251 is about 150 pounds per square inch gauge (psig). In some implementations, the operating temperature of the high pressure production trap 251 is in a range of from about 65° F. to about 130° F. Vapors exit from the high pressure production trap 251. The water flows from the high pressure production trap 251 to the water/oil separation unit 265. The crude oil flows from the high pressure production trap 251 to the low pressure production trap 253.

The low pressure production trap 253 is a three-phase separator and further removes vapors and water from the crude oil. In some implementations, the operating pressure of the low pressure production trap 253 is about 50 psig. In some implementations, the operating temperature of the low pressure production trap 253 is in a range of from about 65° F. to about 130° F. Vapors exit from the low pressure production trap 253. The water flows from the low pressure production trap 253 to the water/oil separation unit 265. The crude oil flows from the low pressure production trap 253 to the low pressure degassing tank 255. In some implementations, the crude oil flowing from the low pressure production trap 253 to the low pressure degassing tank 255 is heated (for example, by a heat exchanger) to increase the crude oil's temperature before entering the low pressure degassing tank 255.

The operating pressure in the low pressure degassing tank 255 is in a range of from about 3 psig to 5 psig. In some implementations, the operating temperature of the low pressure degassing tank 255 is in a range of from about 65° F. to about 130° F. Vapors exit from the low pressure degassing tank 255. The water flows from the low pressure degassing tank 255 to the water/oil separation unit 265. The crude oil flows from the low pressure degassing tank 255 to the dehydrator 257 and to the $1^{st}$ and $2^{nd}$ stage desalters 259, 261. In some implementations, the crude oil flowing from the low pressure degassing tank 255 to the dehydrator 257 is heated (for example, by a heat exchanger) to increase the crude oil's temperature before entering the dehydrator 257.

The water flows from the dehydrator 257 to the water/oil separation unit 265. In some implementations, at least a portion of the water from the $1^{st}$ stage desalter 259 is recycled upstream of the dehydrator 257. In some implementations, at least a portion of the water from the $2^{nd}$ stage desalter 261 is recycled upstream of the $1^{st}$ stage desalter 259. In some implementations, wash water is provided upstream of the $2^{nd}$ stage desalter 261. The crude oil flows from the $2^{nd}$ stage desalter 261 to the stabilizer column 263. The bottoms product from the stabilizer column 263 is the dry crude oil product.

The water streams from the high pressure production trap 251, the low pressure production trap 253, the low pressure degassing tank 255, and the dehydrator 257 are treated in the water/oil separation unit 265 (for example, to remove oil). In the implementation shown in FIG. 2L, the treated water stream flows from the water/oil separation unit 265 to the osmosis separator 201 and is used as the aqueous draw stream 204.

Figure 3A:
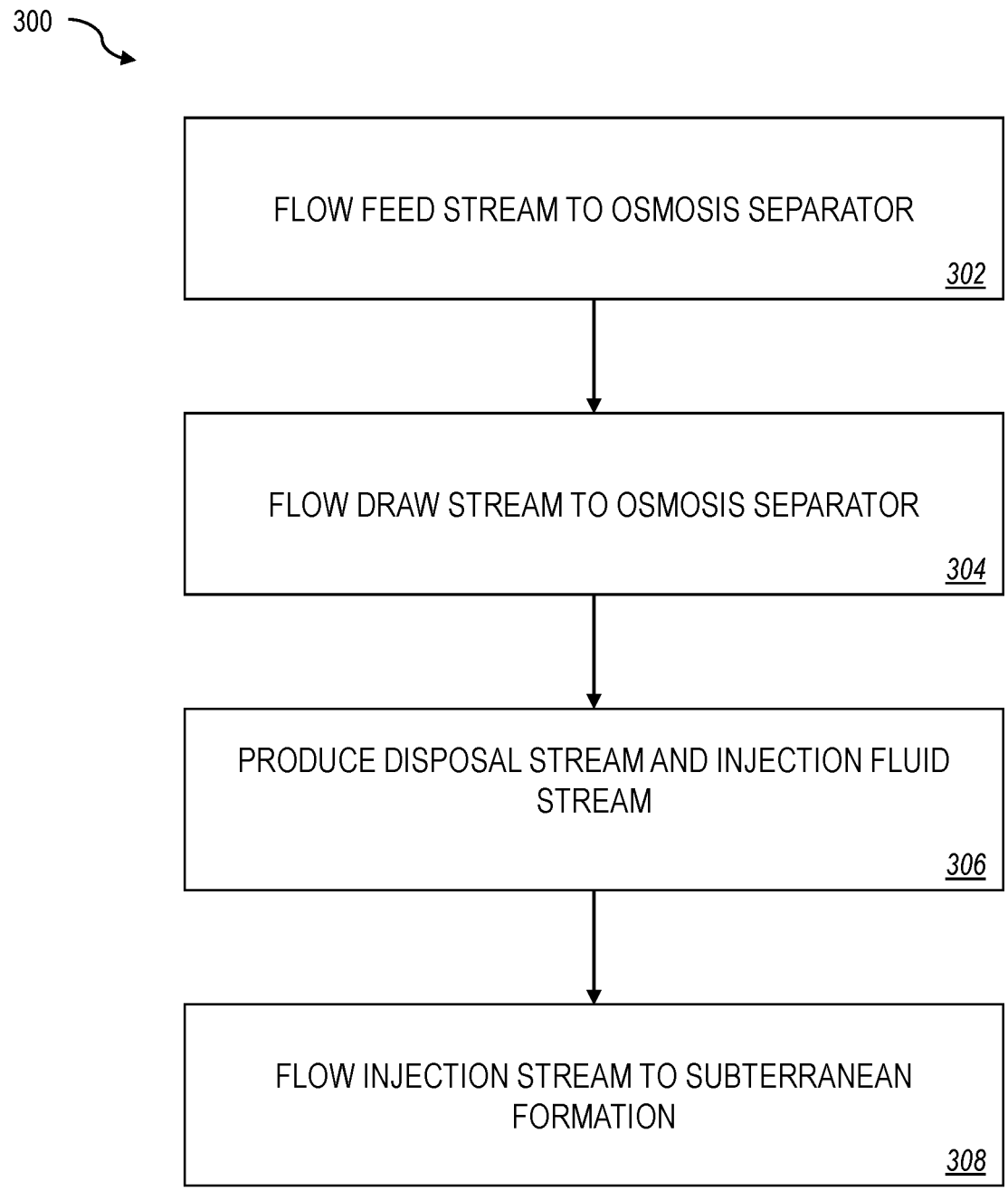
FIG. 3A is a flow chart of an example method for treating water to form an injection fluid that can be flowed to the well of FIG. 1A.

FIG. 3A is a flow chart of an example method 300 for treating water to produce an injection fluid stream (such as the injection fluid stream 208) that can be used to treat a subterranean formation. The system 200 can be used to implement method 300. At step 302, an aqueous feed stream (such as the aqueous feed stream 202) having a first TDS level is flowed to an osmosis separator (such as the osmosis separator 201). As mentioned previously, in some implementations, the osmosis separator 201 is a forward osmosis separator, and the aqueous feed stream 202 includes seawater. For example, the aqueous feed stream 202 is flowed at step 302 to the feed inlet 203a of the feed compartment 203 of the osmosis separator 201.

At step 304, an aqueous draw stream (such as the aqueous draw stream 204) having a second TDS level is flowed to the osmosis separator 201. As mentioned previously, the second TDS level of the aqueous draw stream 204 is greater than the first TDS level of the aqueous feed stream 202. In some implementations, the second TDS level is at least 150% of the first TDS level. For example, the aqueous draw stream 204 is flowed at step 304 to the draw inlet 205a of the draw compartment 205 of the osmosis separator 201.

At step 306, a disposal stream (such as the disposal stream 206) and an injection fluid stream (the injection fluid stream 208) is produced by the osmosis separator 201. The disposal stream 206 and the injection fluid stream 208 can be produced by the osmosis separator 201 at step 306 by allowing water to pass from the aqueous feed stream 202 to the aqueous draw stream 204 through a membrane (such as the membrane 207) of the osmosis separator 201 based on a difference between the first TDS level of the aqueous feed stream 202 and the second TDS level of the aqueous draw stream 204.

At step 308, the injection fluid stream 208 is flowed from the osmosis separator 201 to a subterranean formation. For example, the injection fluid stream 208 is discharged from the injection fluid outlet 205b of the draw compartment 205 of the osmosis separator 201 and flowed at step 308 to the injection well 100 of FIG. 1A. In some implementations, the aqueous draw stream 204 flowed at step 304 includes water from the subterranean formation to which the injection fluid stream 208 is flowed at step 208.

In some implementations, method 300 includes measuring a flow rate of the injection fluid stream 208 from the osmosis separator 201, for example, using the flowmeter 293. In some implementations, method 300 includes adjusting a flow rate of the disposal stream 206 from the osmosis separator 201 based on the measured flow rate of the injection fluid stream 208 from the osmosis separator 201. In some implementations, method 300 includes adjusting a flow rate of the aqueous feed stream 202 to the osmosis separator 201 based on the measured flow rate of the injection fluid stream 208 from the osmosis separator 201. In some implementations, method 300 includes measuring a TDS level of the injection fluid stream 208. In some implementations, method 300 includes adjusting the flow rate of the aqueous feed stream 202 to the osmosis separator 201 based on the measured TDS level of the injection fluid stream 208.

In some implementations, method 300 includes flowing a second aqueous feed stream (such as the second aqueous feed stream 202') having a third TDS level to a second osmosis separator (such as the second osmosis separator 201'). In some implementations, the second osmosis separator 201' is a forward osmosis separator. In some implementations, method 300 includes flowing a second aqueous draw stream (such as the second aqueous draw stream 204') having a fourth TDS level to the second osmosis separator 201'. As mentioned previously, the fourth TDS level of the second aqueous draw stream 204' is greater than the third TDS level of the second aqueous feed stream 202'. In some implementations, the fourth TDs level is at least 150% of the third TDS level. In some implementations, the second aqueous draw stream 204' includes seawater. In some implementations, method 300 includes producing, by the second osmosis separator 201', a second disposal stream (such as the second disposal stream 206') and the aqueous feed stream 202 having the first TDS level. The second disposal stream 206' and the aqueous feed stream 202 are produced by the second osmosis separator 201' by allowing water to pass from the second aqueous feed stream 202' to the second aqueous draw stream 204' through a second membrane (such as the second membrane 207') of the second osmosis separator 201' based on a difference between the third TDS level of the second aqueous feed stream 202' and the fourth TDS level of the second aqueous draw stream 204'.

Figure 3B:
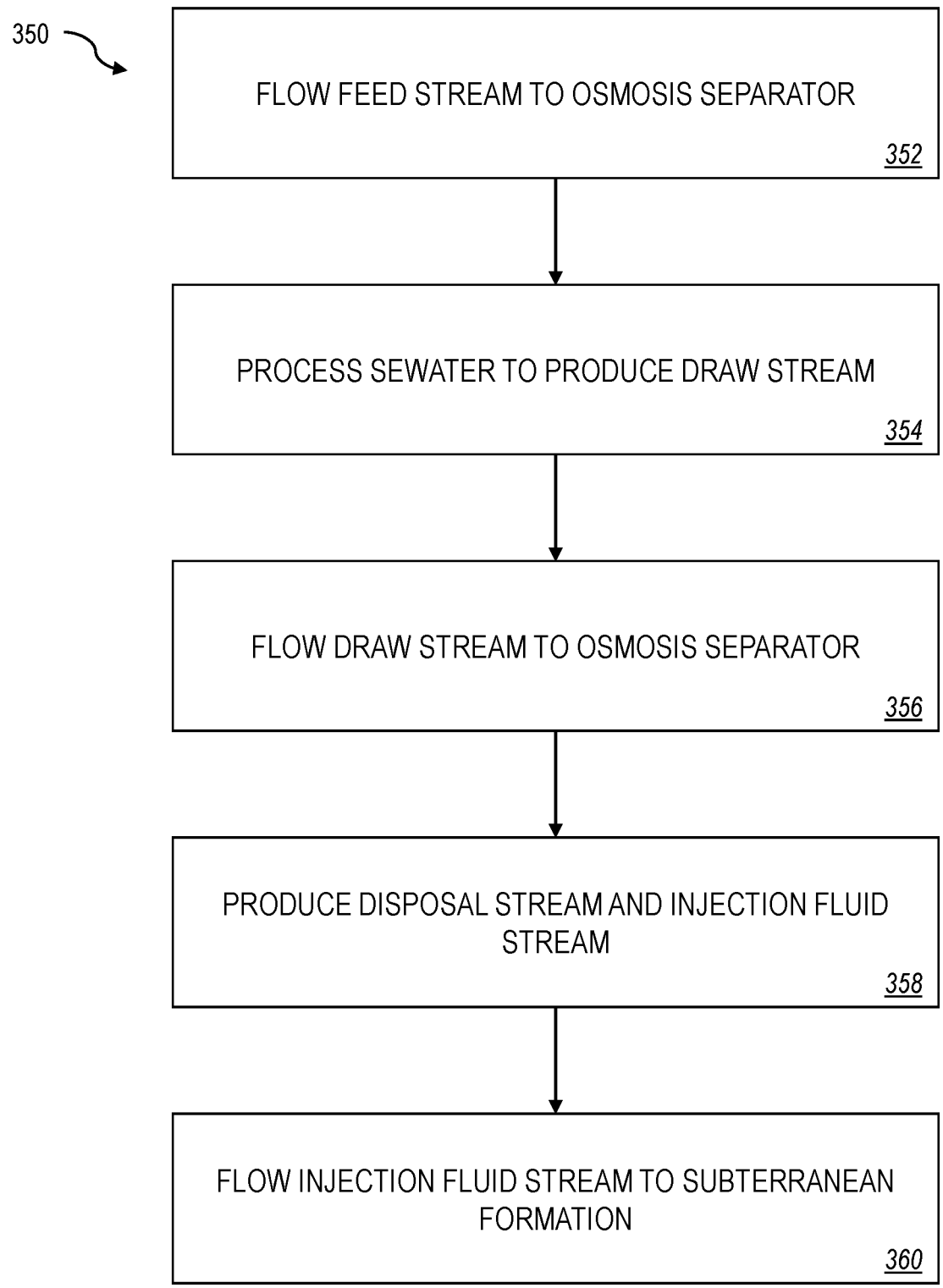
FIG. 3B is a flow chart of an example method for treating water to form an injection fluid that can be flowed to the well of FIG. 1A.

FIG. 3B is a flow chart of an example method 350 for treating water to produce an injection fluid stream (such as the injection fluid stream 208) that can be used to treat a subterranean formation. The system 200 can be used to implement method 350. At step 352, a feed stream (such as the aqueous feed stream 202) having a first TDS level is flowed to an osmosis separator (such as the osmosis separator 201). As mentioned previously, in some implementations, the osmosis separator 201 is a forward osmosis separator, and the aqueous feed stream 202 includes TSE. For example, the aqueous feed stream 202 is flowed at step 352 to the feed inlet 203a of the feed compartment 203 of the osmosis separator 201.

At step 354, seawater is processed to produce a permeate stream (low TDS) and a condensate stream (high TDS). As mentioned previously, the condensate stream can be used as the aqueous draw stream 204, which has a second TDS level greater than the first TDS level of the aqueous feed stream 202. The permeate stream has a TDS level that is less than the second TDS level of the aqueous draw stream 204. In some cases, the permeate stream has a TDS level that is less than the first TDS level of the aqueous feed stream 202. In some implementations, the second TDS level is at least 150% of the first TDS level.

At step 356, the aqueous draw stream 204 is flowed to the osmosis separator 201. For example, the aqueous draw stream 204 is flowed at step 356 to the draw inlet 205a of the draw compartment 205 of the osmosis separator 201.

At step 358, a disposal stream (such as the disposal stream 206) and an injection fluid stream (the injection fluid stream 208) is produced by the osmosis separator 201. The disposal stream 206 and the injection fluid stream 208 can be produced by the osmosis separator 201 at step 358 by allowing water to pass from the aqueous feed stream 202 to the aqueous draw stream 204 through a membrane (such as the membrane 207) of the osmosis separator 201 based on a difference between the first TDS level of the aqueous feed stream 202 and the second TDS level of the aqueous draw stream 204.

At step 360, the injection fluid stream 208 is flowed from the osmosis separator 201 to a subterranean formation. For example, the injection fluid stream 208 is discharged from the injection fluid outlet 205b of the draw compartment 205 of the osmosis separator 201 and flowed at step 308 to the injection well 100 of FIG. 1A.

In some implementations, method 350 includes measuring a flow rate of the injection fluid stream 208 from the osmosis separator 201, for example, using the flowmeter 293. In some implementations, method 350 includes adjusting a flow rate of the aqueous draw stream 204 to the osmosis separator 201 based on the measured flow rate of the injection fluid stream 208 from the osmosis separator 201. In some implementations, method 350 includes measuring a TDS level of the injection fluid stream 208. In some implementations, method 350 includes adjusting the flow rate of the aqueous feed stream 202 to the osmosis separator 201 based on the measured TDS level of the injection fluid stream 208.

FIG. 4 is a block diagram of an example controller 291 used to provide computational functionalities associated with described algorithms, methods, functions, processes, flows, and procedures, as described in this specification, according to an implementation. The illustrated controller 291 is intended to encompass any computing device such as a server, desktop computer, laptop/notebook computer, one or more processors within these devices, or any other processing device, including physical or virtual instances (or both) of the computing device. Additionally, the controller 291 can include a computer that includes an input device, such as a keypad, keyboard, touch screen, or other device that can accept user information, and an output device that conveys information associated with the operation of the controller 291, including digital data, visual, audio information, or a combination of information.

The controller 291 includes a processor 405. Although illustrated as a single processor 405 in FIG. 4, two or more processors may be used according to particular needs, desires, or particular implementations of the controller 291. Generally, the processor 405 executes instructions and manipulates data to perform the operations of the controller 291 and any algorithms, methods, functions, processes, flows, and procedures as described in this specification.

The controller 291 also includes a memory 407 that can hold data for the controller 291 or other components (or a combination of both) that can be connected to the network. Although illustrated as a single memory 407 in FIG. 4, two or more memories 407 (of the same or combination of types) can be used according to particular needs, desires, or particular implementations of the controller 291 and the described functionality. While memory 407 is illustrated as an integral component of the controller 291, memory 407 can be external to the controller 291. The memory 407 can be a transitory or non-transitory storage medium.

The memory 407 stores computer-readable instructions executable by the processor 405 that, when executed, cause the processor 405 to perform operations, such as controlling fluid flow in a system (for example, system 200). There may be any number of controllers 291 associated with, or external to, a computer system containing controller 291, each controller 291 communicating over the network. Further, the term "client," "user," "operator," and other appropriate terminology may be used interchangeably, as appropriate, without departing from this specification. Moreover, this specification contemplates that many users may use one controller 291, or that one user may use multiple controllers 291.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A method comprising:
    flowing an aqueous feed stream having a first total dissolved solids (TDS) level to a forward osmosis separator, the aqueous feed stream comprising seawater;
    flowing an aqueous draw stream having a second TDS level to the forward osmosis separator, the second TDS level greater than the first TDS level;
    flowing a second aqueous feed stream having a third TDS level to a second forward osmosis separator;
    flowing a second aqueous draw stream having a fourth TDS level to the second forward osmosis separator, the fourth TDS level greater than the third TDS level, the second aqueous draw stream comprising seawater;
    producing, by the second forward osmosis separator, a second disposal stream and the aqueous feed stream having the first TDS level by allowing water to pass from the second aqueous feed stream to the second aqueous draw stream through a second membrane of the second forward osmosis separator based on a difference between the third TDS level and the fourth TDS level;
    producing, by the forward osmosis separator, a disposal stream and an injection fluid stream by allowing water to pass from the aqueous feed stream to the aqueous draw stream through a membrane of the forward osmosis separator based on a difference between the first TDS level and the second TDS level; and
    flowing the injection fluid stream from the forward osmosis separator to a subterranean formation.

2. The method of claim 1, wherein the aqueous draw stream comprises water from the subterranean formation to which the injection fluid stream is flowed.

3. The method of claim 2, wherein the second TDS level is at least 150% of the first TDS level.

4. The method of claim 2, comprising:
    measuring a flow rate of the injection fluid stream from the forward osmosis separator; and
    adjusting a flow rate of the disposal stream from the forward osmosis separator based on the measured flow rate of the injection fluid stream from the forward osmosis separator.

5. The method of claim 2, comprising:
    measuring a flow rate of the injection fluid stream from the forward osmosis separator; and
    adjusting a flow rate of the aqueous feed stream to the forward osmosis separator based on the measured flow rate of the injection fluid stream from the forward osmosis separator.

6. The method of claim 2, comprising:
    measuring a TDS level of the injection fluid stream; and adjusting a flow rate of the aqueous feed stream to the forward osmosis separator based on the measured TDS level of the injection fluid stream.

7. The method of claim 2, wherein the fourth TDS level is at least 150% of the third TDS level.

8. A method comprising:
flowing a feed stream having a first total dissolved solids (TDS) level to a first forward osmosis separator, the feed stream comprising a treated sewage effluent;
processing seawater to produce a draw stream and a permeate stream, the draw stream having a second TDS level greater than the first TDS level, the permeate stream having a third TDS level less than the second TDS level;
flowing the draw stream to the first forward osmosis separator;
producing, by the first forward osmosis separator, a second feed stream by allowing water to pass from the feed stream to the draw stream through a first membrane of the first osmosis separator based on a difference between the first TDS level and the second TDS level, the second feed stream having a fourth TDS level intermediate of the first TDS level and the second TDS level;
flowing the second feed stream to a second forward osmosis separator;
flowing an aqueous draw stream to the second forward osmosis separator, the aqueous feed stream comprising water from a subterranean formation, the aqueous draw stream having a fifth TDS level greater than the fourth TDS level;
producing, by the second forward osmosis separator, a disposal stream and an injection fluid stream by allowing water to pass from the second feed stream to the aqueous draw stream through a second membrane of the second forward osmosis separator based on a difference between the fourth TDS level and the fifth TDS level; and
flowing the injection fluid stream from the forward osmosis separator to the subterranean formation.

9. The method of claim 8, wherein the second TDS level is at least 150% of the first TDS level.

10. The method of claim 8, comprising:
measuring a flow rate of the injection fluid stream from the forward osmosis separator; and
adjusting a flow rate of the draw stream to the forward osmosis separator based on the measured flow rate of the injection fluid stream from the forward osmosis separator.

11. The method of claim 10, comprising:
measuring a TDS level of the injection fluid stream; and
adjusting a flow rate of the feed stream to the forward osmosis separator based on the measured TDS level of the injection fluid stream.

12. A system comprising:
an aqueous feed stream having a first total dissolved solids (TDS) level, the aqueous feed stream comprising seawater;
an aqueous draw stream having a second TDS level that is greater than the first TDS level;
a forward osmosis separator comprising:
a feed compartment comprising a feed inlet and a disposal outlet, the feed inlet configured to receive the aqueous feed stream into the feed compartment, the disposal outlet configured to discharge a disposal stream from the feed compartment;
a draw compartment comprising a draw inlet and an injection fluid outlet, the draw inlet configured to receive the aqueous draw stream into the draw compartment, the injection fluid outlet configured to discharge an injection fluid stream from the draw compartment; and
a membrane disposed between the feed compartment and the draw compartment, the membrane configured to allow passage of water between the feed compartment and the draw compartment through the membrane based on a difference between the first TDS level and the second TDS level, thereby forming the disposal stream and the injection fluid stream, wherein the injection fluid stream is configured to be flowed to a subterranean formation;
a second aqueous feed stream having a third TDS level;
a second aqueous draw stream having a fourth TDS level that is greater than the third TDS level, the second aqueous draw stream comprising seawater; and
a second forward osmosis separator comprising:
a second feed compartment comprising a second feed inlet and a second disposal outlet, the second feed inlet configured to receive the second aqueous feed stream into the second feed compartment, the second disposal outlet configured to discharge a second disposal stream from the second feed compartment;
a second draw compartment comprising a second draw inlet and a feed outlet, the second draw inlet configured to receive the second aqueous draw stream into the second draw compartment, the feed outlet configured to discharge the aqueous feed stream from the second draw compartment; and
a second membrane disposed between the second feed compartment and the second draw compartment, the second membrane configured to allow passage of water between the second feed compartment and the second draw compartment through the second membrane based on a difference between the third TDS level and the fourth TDS level, thereby forming the second disposal stream and the aqueous feed stream having the first TDS level.

13. The system of claim 12, wherein the aqueous draw stream comprises water from the subterranean formation to which the injection fluid stream is to be flowed.

14. The system of claim 13, wherein the second TDS level is at least 150% of the first TDS level.

15. The system of claim 13, comprising a flow control subsystem comprising:
a flowmeter configured to measure a flow rate of the injection fluid stream;
a control valve configured to adjust a flow rate of the disposal stream; and
a controller communicatively coupled to the flowmeter and the control valve, the controller configured to adjust a position of the control valve to adjust the flow rate of the disposal stream based on the flow rate of the injection fluid stream measured by the flowmeter.

16. The system of claim 13, comprising a flow control subsystem comprising:
a flowmeter configured to measure a flow rate of the injection fluid stream;
a pump configured to flow the aqueous feed stream to the feed inlet of the feed compartment; and
a controller communicatively coupled to the flowmeter and the pump, the controller configured to adjust a speed of the pump to adjust the flow of the aqueous feed stream to the feed inlet of the feed compartment based on the flow rate of the injection fluid stream measured by the flowmeter.

17. The system of claim 13, comprising a flow control subsystem comprising:
- a TDS meter configured to measure a TDS level of the injection fluid stream;
- a control valve configured to adjust a flow rate of the aqueous feed stream;
- a controller communicatively coupled to the TDS meter and the control valve, the controller configured to adjust a position of the control valve to adjust the flow rate of the aqueous feed stream based on the TDS level of the injection fluid stream measured by the TDS meter.

18. The system of claim 13, wherein the fourth TDS level is at least 150% of the third TDS level.

\* \* \* \* \*